(12) United States Patent
Johnson et al.

(10) Patent No.: US 12,547,296 B2
(45) Date of Patent: Feb. 10, 2026

(54) VIRTUAL WHITEBOARD PLATFORM HAVING COMPACT USER SELECTION CONTROLS

(71) Applicants: Atlassian Pty Ltd., Sydney (AU); Atlassian US, Inc., San Francisco, CA (US)

(72) Inventors: Natalie Kate Johnson, Sydney (AU); Mario Nebl, Sydney (AU); Jonathan George Katahanas, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 18/129,022

(22) Filed: Mar. 30, 2023

(65) Prior Publication Data
US 2024/0329803 A1    Oct. 3, 2024

(51) Int. Cl.
*G06F 3/0482* (2013.01)
*G06F 3/14* (2006.01)
*H04L 65/403* (2022.01)

(52) U.S. Cl.
CPC .......... *G06F 3/0482* (2013.01); *G06F 3/1454* (2013.01); *H04L 65/403* (2013.01)

(58) Field of Classification Search
CPC ..... G06F 3/0482; G06F 3/1454; H04L 65/403
See application file for complete search history.

(56) References Cited

U.S. PATENT DOCUMENTS

| | | | | |
|---|---|---|---|---|
| 6,133,915 A | * | 10/2000 | Arcuri | G06F 3/0481 715/779 |
| 9,798,450 B1 | * | 10/2017 | Urasaki | G06F 3/0482 |
| 11,907,605 B2 | * | 2/2024 | Chang | G06F 3/1454 |
| 2001/0034016 A1 | * | 10/2001 | Ziv-el | G09B 7/02 434/350 |
| 2010/0107062 A1 | * | 4/2010 | Bacus | G06F 40/109 715/781 |
| 2020/0319777 A1 | * | 10/2020 | Mondri | G06F 3/0482 |
| 2022/0270050 A1 | * | 8/2022 | Stringham | G06F 3/04845 |

OTHER PUBLICATIONS

Geeky Shows, Microsoft Office Word 2010 Bold, Italic and underline commands, 4 pages (Year: 2015).*

* cited by examiner

*Primary Examiner* — K C Chen
(74) *Attorney, Agent, or Firm* — Brownstein Hyatt Farber Schreck, LLP

(57) ABSTRACT

A virtual whiteboard may be configured to generate compressed user menus. A whiteboard has a graphical user interface with an unstructured canvas region that renders graphical objects generated by multiple users. In response to receiving a selection of at least one graphical object, a menu control with a first array of may be displayed with a first key indicator corresponding to a first format option. In response to receiving a first selection of the first user-selectable control, the first format option may be applied to the graphical object. In response to receiving a second user selection of another menu control, an auxiliary menu control may be displayed. In response to receiving a second user selection of a second auxiliary selectable control, the second format option may be applied, the key indicator may be replaced with a composite key indicator that corresponds to the first and the second format option, combined.

20 Claims, 19 Drawing Sheets

VIRTUAL WHITEBOARD PLATFORM HAVING COMPACT USER SELECTION CONTROLS

TECHNICAL FIELD

Embodiments described herein refer to a virtual whiteboard platform. In particular, embodiments described herein refer to a virtual whiteboard platform having compact user selection controls.

BACKGROUND

During videoconferences, team members often need to share data, interact with participants, record action items, brainstorm ideas, and get feedback from their team. However, existing platforms and/or software provide limited functionality to achieve these goals in an "all-in-one" platform. For example, conventional software, such as a word editor software, does not provide the flexibility to accommodate a broad range of items and/or shapes users may need to express their ideas. Also, conventional word editor software typically has a structured page area with predefined margins that make collaborating and/or expanding on ideas more difficult. The present disclosure is directed to a virtual whiteboard platforms that can provide users with more flexibility for the range of shapes and space that users may need in a collaborative session. In particular, the present disclosure is directed to a virtual whiteboarding platform that includes a user interface and integrations for generating issue objects in a separate issue tracking system, thereby reducing or eliminating the need to load and display an interface for the separate issue tracking system. The present disclosure also includes user interface improvements that improve the operation and use of the virtual whiteboarding platform.

SUMMARY

Embodiments described herein relate to a virtual whiteboard with adaptive functionality that facilitates the interface between the whiteboarding application and other platforms. In some embodiments, the virtual whiteboard creates issue objects in an issue tracking platform through a user interface which leverages content from user-generated graphical objects within a virtual canvas. In this configuration, users can efficiently capture action items without context switching. In other embodiments, the virtual whiteboard includes compressed user menus efficiently displays user controls and streamlines the creation of primitives. Thus, during videoconferences, for example, users can concurrently create visually-appealing whiteboarding sessions that enhance collaboration in teams.

A method for generating a new issue object in an issue tracking platform from a virtual whiteboard of a content collaboration platform may include causing display of a graphical user interface of the virtual whiteboard that has an unstructured canvas region configured to render graphical objects generated by multiple users from multiple user devices during a whiteboarding session. In response to a user designating a sub-region within the unstructured canvas region, a set of graphical objects displayed within the sub-region may be displayed. The set of graphical objects may be analyzed to identify a set of candidate graphical objects satisfying a content criteria. In response to the set of candidate graphical objects satisfying the content criteria being identified within the sub-region, a user-selectable menu with an issue creation option may be displayed. In accordance with the user selecting the issue creation option, user-generated object content from each graphical object of the set of candidate graphical objects may be extracted and a set of fields from the issue tracking platform may be obtained. An issue creation interface within the virtual whiteboard may be displayed having a set of editable regions corresponding to the set of fields received from the issue tracking platform. A first editable region of the set of editable regions of the issue creation interface may be populated based on the extracted user-generated content. User input in one or more editable regions of the set of editable regions may be received. In response to a confirmation input, an application programming interface (API) command may be generated using input provided to the set of editable regions. The API command may be caused to create a set of issue objects in the issue tracking platform.

In some embodiments, an issue tracking platform may be queried to obtain a set of issues satisfying a similarity criteria and a second editable region of the set of editable regions of the issue creation interface may be populated based at least in part on the queried set of issues satisfying the similarity criteria. A set of minimum required fields from the set of fields received from the issue tracking platform may be obtained from the issue tracking platform. In response to receiving the user confirmation input, whether each field of the set of minimum required fields has an entry in a corresponding editable region of the set of editable regions may be determined. In accordance with a field of the set of minimum required fields having null data, the confirmation input may be temporarily disabled.

For each new issue object of the set of issue objects created in the issue tracking platform, within the unstructured canvas region, each candidate graphical object of the set of candidate graphical objects may be replaced with a respective selectable graphical object. The respective selectable graphical objects includes metadata extracted from a respective new issue object. The respective selectable graphical objects are each selectable to cause display of the respective new issue object within the issue tracking platform. In some examples, the issue creation interface is a second issue creation interface. A first issue creation interface including a selectable list of the set of candidate graphical objects may be displayed and, in response to a user deselecting at least one issue of the set of candidate graphical objects, the set of candidate graphical objects may be updated and the second issue creation interface may be updated.

In some embodiments, in response to a user selection, within the unstructured canvas region, of an issue object, the user-selectable menu with an edit issue option may be displayed. In some cases, the user is a first user, the sub-region is a first sub-region, and the set of graphical objects is a first set of graphical objects. In accordance with a second user designating a second sub-region, a second set of graphical objects may be analyzed in accordance with the content criteria and in accordance with the second set of graphical objects failing the content criteria, display of the issue creation option within the user-selectable menu may be suppressed.

A method for creating an issue object in an issue tracking platform using a virtual whiteboard of a content collaboration platform may include, during a videoconference, causing display, at user devices participating in the videoconference, of a graphical user interface of a virtual whiteboard comprising an unstructured canvas region configured to render graphical objects generated by multiple users from multiple user devices. In response to a first user creation request of a first graphical object, the first graphical object with the unstructured canvas region may be rendered. In response to a second user creation request of a second graphical object, the second graphical object with the unstructured canvas region may be rendered. In accordance with receiving a selection of the first and second graphical objects: object content may be extracted from each the first and the second graphical object, an issue tracking platform using the object content to obtain issue data may be queried, for each the first and the second graphical object, a predicted issue type based on one or more of: the obtained issue data or context data obtained from the virtual whiteboard may be determined; an issue creation form with a set of fields obtained from the issue tracking platform may be generated; display of the issue creation form in an object creation interface may be caused; an issue type suggestion for each the first and the second issue, the issue type suggestion corresponding to the predicted issue type may be generated; and user input in one or more fields of the set of fields may be received. In response to a create issue request, an application programming interface (API) command based on the user input provided to the set of fields may be generated and the API command may be caused to create a first issue object and a second issue object in the issue tracking platform.

In some embodiments, the issue type suggestion comprises a set of issue types, each issue type of the set of issue types determined based at least in part on the object content and the context data obtained from the virtual whiteboard. In some examples, in accordance with receiving a user selection of the first and the second graphical objects, display of a floating menu of issue creation option may be caused. The issue creation option may be configured to display a number of issues requested to be created corresponding to a number of graphical objects selected comprising user-generated text. The issue creation form may be configured to display a required set of fields from the issue tracking platform and, in response to a user request, display of an expanded issue creation form having all issue creation fields from the issue tracking platform may be caused.

In some cases, the set of fields may include an assignee field. In response to the user selecting the assignee field, a list of users sorted by recent assignees may be displayed. A project corresponding to a content data obtained from the virtual whiteboard may be extracted and a project field of the issue creation form may be populated in accordance with the project extracted from the content collaboration platform. In some cases, the first graphical object is handwritten text and, in accordance with the user selection of the first graphical object, optical character recognition to convert the handwritten text to a string may be performed.

A method for creating a new issue object in an issue tracking platform through a virtual whiteboard application of a content collaboration platform is disclosed herein. The method may include causing display of a graphical user interface of a virtual whiteboard having an unstructured canvas region configured to render graphical objects generated by multiple users from multiple user devices. In response to receiving a request from a first user to generate a graphical object comprising text, the graphical object within a position defined by the first user may be rendered. In response to receiving a selection of the graphical object from a second user, a user-menu an issue creation button may be displayed, wherein the first user is different from the second user. A selection of the issue creation button may be received and the second user may be authenticated with respect to the issue tracking platform. In accordance with the second user being authenticated with respect to the issue tracking platform, a set of fields via an API may be retrieved from the issue tracking platform and a user interface (UI) form may be generated that includes user-editable regions corresponding to the set of fields from the issue tracking platform. The UI form as a window within the unstructured canvas region may be displayed. In response to receiving user input to set of required user-editable regions of the user-editable regions, an API command may be generated including an API action corresponding to creating an issue object. The API command may be caused to create the issue object in the issue tracking platform. The graphical object may be replaced with a selectable graphical object corresponding to the issue object in the issue tracking platform, the selectable graphical object may be configured to instantiate an instance of the issue tracking platform in response to a user selection of the selectable graphical object.

In some cases, a plurality of issue objects from the issue tracking platform may be retrieved via the API call. The text of the graphical object with respect to the plurality of issue objects may be analyzed. A semantic similarity matrix may be assigned to at least a subset of issue objects within the plurality of issue objects and content for at least one user-editable region of the user-editable regions may be suggested based at least in part on the assigned semantic similarity matrix of the at least the subset of issue objects satisfying a threshold. In some cases, the suggested content for at least one field for the set of fields is a project. In other examples, an issue description field of the user-editable regions may be prepopulated in accordance with the text of the graphical object. In some embodiments, the graphical object is positioned within the unstructured canvas region during a videoconference. The selectable graphical object may include an issue summary and issue number, in some cases.

A method for displaying a compressed user menu within a graphical user interface of a virtual whiteboard may include causing display of a graphical user interface of the virtual whiteboard with an unstructured canvas region configured to render graphical objects generated by multiple users from multiple user devices. A plurality of graphical objects from multiple users having a user-defined area and positioned within the unstructured canvas region may be rendered. In response to a user selection of at least one graphical object of the plurality of graphical objects, an object primitive type of the at least one graphical object may be identified. In response to identifying the object primitive type of the at least one graphical object, a set of user-selectable controls associated with the object primitive type may be selected. A menu control having a first horizontal array of the set of user-selectable controls may be displayed, where a first user-selectable control of the set of user-selectable controls displays a first key indicator corresponding to a first format option. In response to receiving a first selection of the first user-selectable control, the first format option may be applied to the at least one graphical object. In response to receiving a second user selection of an element of the menu control, an auxiliary menu control may be displayed with a second horizontal array of user selectable controls including a first auxiliary selectable control corresponding to the first format option and a second auxiliary selectable control corresponding to a second format option. In response to receiving a second user selection of the second auxiliary selectable control, the second format option may be applied to the at least one graphical object. The first key indicator of the first user-selectable control may be replaced with a composite key indicator that corresponds to a composite format option that includes the first format option and second format option.

In some embodiments, in response to a third selection of the first user-selectable control with the composite key indicator, the first format option and the second format option may be applied to the at least one graphical object. In accordance with a respective format option currently being applied to the at least one graphical object, selection of the first user-selectable control removes the respective format option with respect to the at least one graphical object. In accordance with the respective format option not currently being applied, selecting of the first user-selectable control applies the respective format option.

In some examples, in response to the selection from the auxiliary menu control, the auxiliary menu control may be removed from display. Subsequent selection of the at least one graphical object causes display, within the menu control, of a second key indicator, the second key indicator corresponding to a last format option selected with respect to the at least one graphical object. In response to a user deselecting the first format option, the composite key indicator may be updated to a second key indicator correspond only to the second format option. In response to a user deselecting the second format option, the second key indicator may be updated to a third key indicator corresponding to a default format option.

A method for updating a user menu in a virtual whiteboard may include causing display of a graphical user interface of the virtual whiteboard including an unstructured canvas region configured to render graphical objects generated by multiple users from multiple user devices. A primitive bar menu may be displayed including an array of primitive types configured to be dragged onto the unstructured canvas region, each primitive type having a corresponding primitive indicator. In response to a user selection of a first primitive type of the array of primitive types, a sub-menu with a set of primitive sub-types may be displayed. In accordance with a user selection of a first primitive sub-type of the set of primitive sub-types, the primitive indicator of the first primitive type may be updated to correspond to the selected first primitive sub-type. The first primitive sub-type may be rendered over the cursor of the user. In response to receiving a user selection corresponding to a position of the first primitive sub-type over the unstructured canvas region, a graphical object may be generated.

In some embodiments, in response to receiving a dragging motion from the first primitive type within the primitive bar menu to the unstructured canvas region, the first primitive type may be rendered over the cursor of the user, the rendering having a same dimension as a dimension of the generated graphical object. In response to a user selection of a second primitive type of the array of primitive types, primitive sub-types may be identified. In accordance with the second primitive type having a single primitive sub-type, display of the sub-menu may be suppressed. A user-control menu with a set of user controls may be displayed, each user control having a corresponding key indicator. A key indicator of a first user control of the set of user controls may be updated corresponding to the first primitive type.

In some examples, the first primitive type is a shape and the set of primitive sub-types are types of shapes. The first primitive type may be a line and the set of primitive sub-types may be line shapes. The primitive bar menu may also include a create issue option configured to generate an application programming interface (API) call to an issue tracking platform.

A method for displaying and updating user menus within a graphical user interface of a virtual whiteboard may include causing display of a graphical user interface of the virtual whiteboard with an unstructured canvas region configured to render graphical objects generated by multiple users from multiple user devices and a primitive bar having a set of selectable primitive objects, each selectable primitive object displaying a corresponding primitive indicator, the primitive bar configured to create graphical objects in response to user input. A plurality of graphical objects may be rendered from multiple users having a user-defined area and positioned within the unstructured canvas region. In response to a user selection of a first graphical object of the plurality of graphical objects, an object primitive type of the first graphical object may be identified. In response to identifying the object primitive type of the first graphical object, a set of user-selectable controls associated with the object primitive type may be selected. A menu control comprising an array of the set of user-selectable controls may be displayed, each user-selectable control displaying a corresponding key indicator. In response to receiving a selection of a first user-selectable control of the set of user-selectable controls corresponding to a format option, a key indicator of the first user-selectable control may be updated to correspond to the format option. Within the primitive bar, display of the primitive indicator corresponding to the object primitive type may be update to a first selectable primitive object of the set of selectable primitive objects, and to the format option. In accordance with receiving a user selection of the first selectable primitive object, a second graphical object having the format option applied may be rendered.

In some cases, in accordance with a user selection of a third graphical object, the object primitive type may be identified, a set of format options corresponding to the third graphical object may be identified, and display of the primitive indicator may be updated within the primitive bar corresponding to a second selectable primitive object. The set of selectable primitive objects may include a line, a shape, a sticky note, and a text box. The format option may be color, a line shape, a shape type, and so on.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
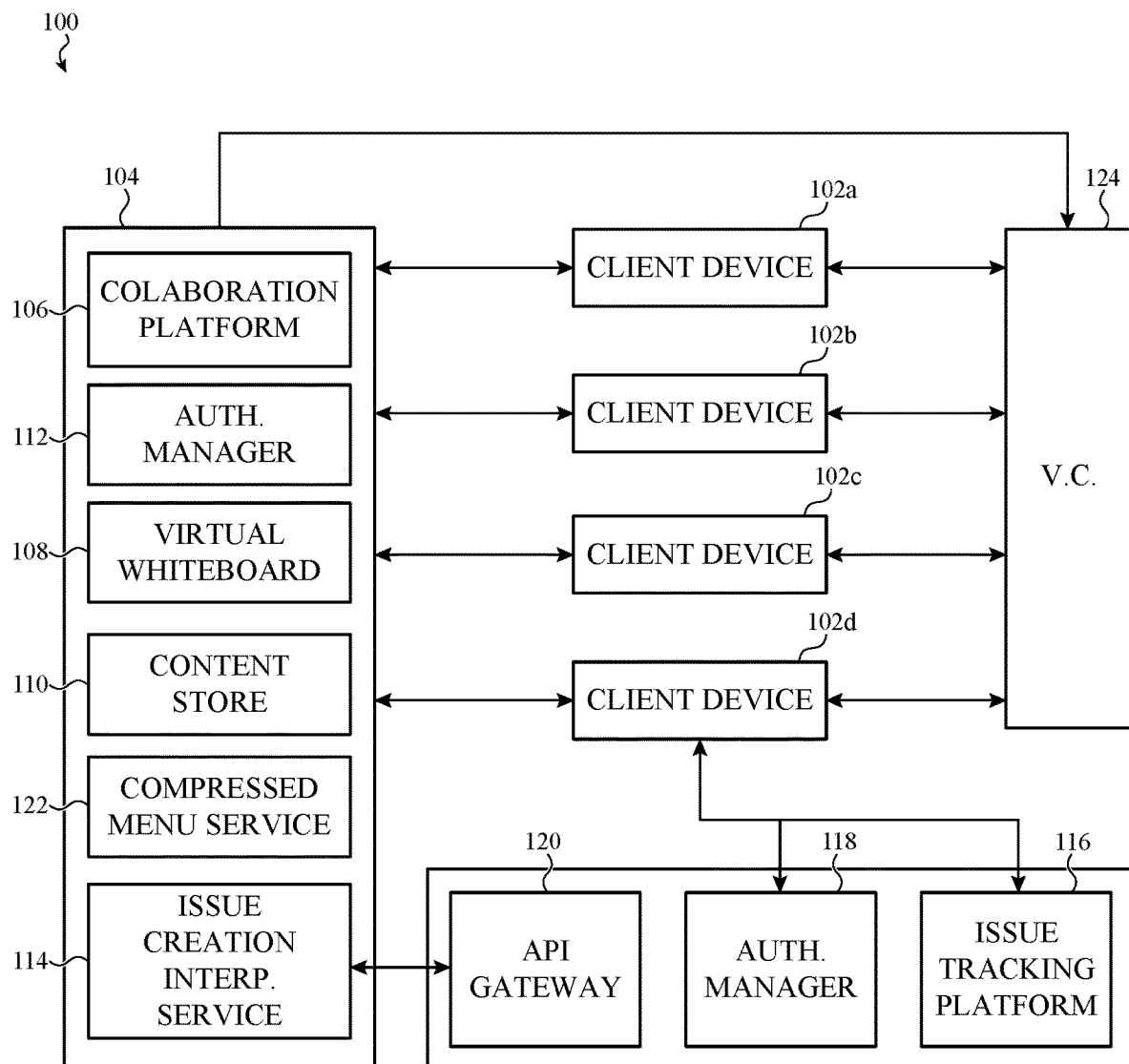
FIG. 1 depicts an example system for creating issue objects and displaying compressed user menus using a virtual whiteboard.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to a virtual whiteboard platform. In particular, the whiteboard platform includes a user interface and integration which allows users to create issue objects in a separate issue tracking platform from a variety of graphical objects (e.g., sticky notes, text boxes, handwritten text, and so on) that are native to the whiteboard platform. In some embodiments, the content of the graphical objects may be used to predict issue types, projects, sites, assignees, and any other relevant issue field of the issue tracking platform to assist the user when creating issue objects. The improved virtual platform also includes compressed user menus which allows users to intuitively change the format and other visual parameters of graphical objects without extended top menus, tabs, or side panels that may otherwise to take up valuable real estate in the whiteboarding canvas or editable area.

A whiteboarding application, such as described herein, may allow users to interact and contribute ideas in a digital canvas. For example, users may add handwritten notes, sticky notes, doodles, and many other visual graphics that convey ideas, capture action items, brainstorm solutions, and so on. Unlike many traditional digital files, users can contribute to the canvas contemporaneously, which improves virtual collaboration during a multi-user whiteboarding session. The virtual canvas also allows users to move and/or shift content within the digital canvas without having to erase work or generate multiple pages or documents. Similarly, collaborative sessions in whiteboard applications can be saved for later reference.

Unlike the whiteboard application described herein, many traditional collaboration tools lack integrations to separate platforms and the ability to predict user input for object creation. For example, in many collaborative sessions, action items or tasks are captured as freeform notes or text. To implement these action items or tasks, users often need to manually note tasks and transcribe them onto the appropriate platforms and/or capture accordingly in an email or in a document. As a result of this manual transcribing process, some action items may be lost in the process. Also, in some cases, users may need to toggle between the collaboration tool and tracking platforms to transcribe notes, which requires multiple instantiations of different applications. Typically, this requires additional computing resources and may also require the user to manually switch between platforms, also referred to as "context switching," which can be an inefficient way to operate a user interface. Many times, action items may not be captured at all because of this tedious task—causing frustration for users and potentially lost data. Similarly, follow up meetings may be needed to recapture action items that were not logged and/or formalized.

In a traditional use case of the whiteboarding application described herein, while the digital canvas may be unbounded or large, the amount of canvas that is viewable for a particular user may be fairly limited due to the size of the display of the client device. Additionally, many of the primitives and/or graphical objects created on the digital canvas are large to enable easy manipulation. As a result, there may be limited space available for user interface controls. However, user interfaces of some collaboration platforms are modeled after graphical editors and/or word editor software, which may not be appropriate for the whiteboarding application. In particular, user interfaces of graphical editors and/or word editor software are typically designed for specialized graphical and/or word editing purposes and, accordingly, give users a wide variety of user menus splayed across the user interface. For example, a word editing software may have a long menu of text formatting options such as bold, italics, underline, superscript, subscript, all caps, small caps, strikethrough, double strikethrough, and so on. As another example, in graphical editing software, changing the line thickness, dash, color, pattern, or any other aspect of a figure requires a separate top menu or side panel. Notably, user menus of traditional editing software often take up significant real estate in a display. Some of the example user interface controls described herein are designed for use in a whiteboard and are designed to minimize space while providing the flexible controls that are useful for generating content on the digital canvas.

Unlike traditional editing software, the whiteboard application described herein has a wide range of graphical objects and more degrees of freedom. For example, the whiteboarding application may have the option to add shapes, text, sketches, and photos. As a result of the wide selection of whiteboard functions, general formatting options are often limited. In other cases, user menus may be cumbersome for users to navigate. In fast-paced collaborative environments, like during videoconferences, having difficulty finding menu items can interfere with the collaboration and/or result in a bland visual interface.

The user interface examples described herein can include adaptive functionality that facilitates the interface between the whiteboarding application and other platforms. The whiteboard may also include compressed menus that makes it easier for users to quickly change the look of graphical objects. The whiteboard application has an unstructured canvas region which allows for shared editing capabilities. For example, multiple users can concurrently edit, add graphical objects, delete items, move items, and so on. As described herein, the unstructured canvas region is a virtual canvas that can be expanded in any direction within the 2D plane of the canvas. For example, the editor region or canvas extends as users add more content. Because the canvas region is unstructured, it allows graphical objects and/or any other content to be placed anywhere within the region. In other words, the canvas region allows users to place content without grid restrictions, margins, or size limitations (e.g., freeform). As a result of this configuration, during a video conference, team members may concurrently collaborate (e.g., on a project) similar to collaboration using whiteboards in traditional physical meeting rooms.

Unlike some traditional collaboration tools, the whiteboard application described here can communicate (e.g., through an API call) to other platforms, such as an issue tracking platform, a content collaboration platform, or other third party platforms. By communicating with an issue tracking platform, for example, users can track action items and capture important items from a whiteboard session. For example, the virtual whiteboard can be used to create issue objects to capture action items in an issue tracking platform. Issue tracking platforms provide a beneficial structure to organize and track issues once they are logged. However, many times these issues do not emanate from the issue tracking platform. In the whiteboard application, such as described herein, an issue object can be created from graphical objects, such as sticky notes, text boxes, handwritten text, and/or any other graphical objects.

In some embodiments, issue objects can be generated from multiple graphical objects. As a non-limiting example, a user may select a grouping of native graphical objects, which may include multiple virtual sticky notes and select a "CREATE ISSUES" option. These options may be available through a floating window displayed when the user selects the graphical object. The virtual whiteboard application may query an issue tracking platform to obtain a number of required fields, issue types, projects, and so on. In response to the query, the virtual whiteboarding application may display a window related to creating an issue object. In some embodiments, the content of the graphical objects, such as user generated text, may be analyzed to determine a value and/or to assign issue type, project, assignee, and so on. For example, a backend application may analyze the content extracted from the sticky notes and determine that the content refers to different steps in a software development project (e.g., via a predictive model, machine learning model, or any other suitable algorithm). In this example, the set of sticky notes may include: project definition, code development, code review, testing, code deployment, and so on. In response, the backend application may obtain a set of projects relating to the development of software and may obtain an issue type based on the obtained project and content of the sticky notes. As a result of this association, vague action items, such as "review schedule" may be analyzed in the context of the rest of the sticky notes and an issue type may be identified as "track software development project."

Each of these automated queries exemplified above may include application programming interface (API) calls to a remote host. The host may return content data and/or issue data from the issue tracking platform to the virtual whiteboard. Once the user populates the data required to create an issue and/or accepts the suggestions from the predictive model described above, the virtual whiteboarding application may generate a command that includes an API call to create the issue object or bulk action to create a set of issues. Once an issue is created, the virtual whiteboarding application may replace the original native object (e.g., the virtual sticky note) with a user-selectable button or other similar graphical object (e.g., a graphical selectable link with embedded content) that directs the user to the issue tracking platform. In some cases, users may opt to keep the original native object (virtual sticky note) or update the native object to include content extracted from the newly created issue object. In one example, the virtual sticky notes may include an additional link and/or metadata of the issue object or it may continue to display as a native graphical object. The issue status may be updated in the graphical user interface of the virtual whiteboard platform. For example, a completed issue object may change colors in response to an update from the issue tracking platform. An issue object requiring immediate attention may be highlighted such that the users interfacing the whiteboard can be aware of changes in other platforms. In this example, the canvas region may have a set of visual cues that facilitate collaboration.

Likewise, the user menus of a virtual whiteboard platform described herein make user controls more readily accessible and intuitive than traditional collaboration tools. For example, the whiteboard platform may have a compressed floating menu. As used herein, a compressed floating menu refers to a menu of user controls having a limited number of user controls at a first-level interface. Each user control at the first level may reflect a category or grouping of user controls. For example, a compressed user menu may have five user control items, ten user control items, and so on. Each user control item may have an additional expandable menu or auxiliary menu controls which allows the user to select additional control items in the same category.

As a non-limiting example, when a user selects a text box with user-created text, a floating window with a compressed user menu may be displayed. The compressed user menu may have five user controls, each displaying a different indicator. One of the users controls may be a text format option. In this example, the key indicator may be a "B" (e.g., the key indicator for bold text). This user control for text format may have an expandable menu or an auxiliary selectable control that includes "B," "I," and "U" (bold, italics, and underline, respectively). In response to a user selection of the "U" (underline) option, the key indicator at the first level of the user control may be updated to "U." In response to a further user selection of "B" (bold), the key indicator may be updated to "B" (bolded underline). Thus, a user changing a text format of text in a graphical object can intuitively see the selected format of the text without having to refer to the auxiliary user control. The compressed menu takes up less real estate within the canvas region.

Similarly, the compressed menu may change in accordance with the graphical object type that the user selects. For example, a sticky note with user-generated text may have a compressed menu that includes text format and sticky note format options. However, a sticky note without text may not have any user controls relating to text. Similarly, a line without text may have a compressed menu that includes line thickness, color, line style options, and connector types. As a result of this configuration, users can visualize the controls available for each object type without referring to top menus and/or without prior experience with the application's interface.

As another non-limiting example, the whiteboard includes a primitive bar (e.g., a quick access menu). The primitive bar includes an array of primitive objects which users may select to place to generate graphical objects. Similar to the compressed menu described above, each primitive object of the primitive bar may include a primitive indicator that shows the user a format or shape of the objects to be selected. In some embodiments, primitive objects includes sub-types (e.g., different line shapes, different line thickness, different shapes). In response to a user selection of a primitive object with multiple sub-types, a sub-menu may be displayed configured to allow the user to quickly select different primitive sub-types. A selection of a sub-type causes an update of the primitive indicator and causes the primitive to be rendered (at a similar dimension or near-similar dimension as the graphical object to be created, for example). In some cases, the compressed user menu is also updated to display the primitive sub-type selected. In some examples, the user may select a primitive sub-type and modify the sub-type in the compressed user menu, causing the key indicator and the primitive indicator to be updated concurrently. The user selection of a primitive sub-type (e.g., a format option) saves the user selection. Subsequent selections by the user of the same primitive object, adopts the prior formatting option.

These foregoing and other embodiments are discussed below with reference to FIGS. 1-9. However, those skilled in the art will readily appreciate that the detailed description given herein with respect to these figures is for explanation only and should not be construed as limiting.

FIG. 1 depicts an example system 100 for implementing a whiteboard platform described herein. The system 100 is configured to quickly create issue objects in an issue tracking platform without context switching (e.g., without leaving the canvas region of the whiteboard platform graphical user interface). The whiteboard platform may communicate with the issue creation platform (e.g., through an API call) to generate suggestions, assign issue types, assign projects, designate assignees, and so on based on the content of the graphical object(s) selected for issue creation. The system 100 may also display compressed user menus that change based on graphical object type and show users selected visual controls using a single indicator per category of controls.

As depicted in FIG. 1, the system 100 may include client devices 102*a-d*. Each client device 102*a-d* may instantiate a client application 104 that is configured to generate and display a graphical user interface (GUI). Each client device 102*a-d* may access the client application 104 through a web browser, a dedicated application, or other similar software application that is configured to access content. In some embodiments, the client application 104 serves as a frontend for a backend service, such as the content collaboration platform 106.

The content collaboration platform 106 allows for enterprise-wide content creation and may include a documentation platform, wiki platform or other system for creating and managing user-generated content. For example, the content collaboration platform 106 may be used to create and store user-generated content (e.g., pages) within the enterprise, share content with third parties (e.g., contractors), and/or share content with the public. The content collaboration platform may also have or be used in conjunction with a videoconferencing service (e.g., videoconferencing service 124), which provides real-time audio and visual meeting functionality to users. In some embodiments, the virtual whiteboard may be shared through the videoconferencing service 124 via one or more of the client devices 102*a*, 102*b*, 102*c*, 102*d*. In some cases, the videoconferencing service integrated with the virtual whiteboard and a video stream from the conference may be displayed within the virtual whiteboard.

The virtual whiteboard 108 may be accessed by multiple client devices (e.g., client devices 102*a-d*) concurrently. During a real-time collaboration session, users may add, delete, or edit content from the virtual whiteboard 108. For example, during a videoconference (e.g., accessed through a videoconferencing service 124), team members may discuss a project in real time and each team member can contribute to the meeting in real time. For example, a videoconference may elicit feedback on a drawing. Each team member may actively mark up the drawing during the meeting and provide verbal comments concurrently. As discussed above, the virtual whiteboard 108 user interface includes an unstructured canvas that allows users to freely add, delete, or edit content. As a non-limiting example, a first user may add a series of (virtual) sticky notes for users to comment on (e.g., each sticky note may have a slogan) to the unstructured canvas. Afterwards, multiple users may add emojis or handwritten text over or around each sticky note to vote on the slogan. Because of the unstructured nature of the canvas, users are not restricted in where graphical items are placed. Thus, users can create freely without being restricted by straight lines, margins, or object placement rules. This allows teams to create aesthetically pleasing collaboration sessions. While a concurrent, real-time collaboration is exemplified above, in other embodiments users may work individually on the canvas at asynchronous times.

In some embodiments, the client application is configured to access the content store 110 in order to provide the functionality related to the content collaboration platform 106 and/or the virtual whiteboard 108. The authorization manager 112 may be used to authenticate the user and allow access to the content store 110. For example, the authorization manager issues tokens or other authentication credential that can be used to access the content collaboration platform 106 and/or the virtual whiteboard 108.

The client application 104 may include an issue creation and interpretation service 114. The issue creation and interpretation service 114 is configured to assist the user in the creation of issues in an issue tracking platform 116. In some embodiments, the issue creation and interpretation service 114 communicates with the issue tracking platform 116 (e.g., through an API call) and is able to extract user generated content from graphical objects (e.g., sticky notes, text boxes, and so on) to populate a field or fields in an issue creation window displayed over the whiteboard canvas.

In some embodiments, a user may select a graphical object or set of graphical objects to convert to issues. In response to receiving the user selection, the issue creation and interpretation service 114 may query the issue tracking platform 116 and obtain a set of issue creation fields. In some examples, the issue creation and interpretation service 114 may query the issue tracking platform 116 to obtain a set of existing issues in the tracking platform. The service may analyze the queried data to determine a similarity between the content of the graphical objects and the existing issue. Based on the analyzed data, the service may provide issue creation suggestions to a user. For example, the service may conduct a semantic similarity analysis to determine if a similar or same issue has already been created. In other embodiments, the content of the graphical objects are analyzed to predict an issue type or project based on the similarity of that content with respect to the content in the issue description and/or summary of existing issues. The issue creation and interpretation service 114 is configured to cause display of a window with the canvas region prompting the user to create an issue object or bulk action to create a set of issue objects. In some embodiments, the window includes a set of editable regions that match corresponding fields in the issue creation platform. Based on the extracted data, the fields may be prepopulated (e.g., from the predicted issue type, project, and so on). In some examples, certain fields may have a drop-down menu which displays a list of items based on the predicted data. In other examples, the content of the drop down menu may be sorted by semantic similarity based on the predicted data, alphabetically, recently used, and so on.

Once a user confirms the inputs to create the issue object, the issue creation and interpretation service generates an API request to the API gateway 120 of the issue tracking platform 116. The API may be formulated in accordance with a Representational State Transfer (REST) or RESTful API that can be implemented using a web-enabled schema like JavaScript Object Notation (JSON) or other schema. In some cases, the API has a specific query schema in accordance with one or more standards including GraphQL. Apollo, Oracle PL/SQL, or other schema. The API calls generated by the issue creation and interpretation service 114 may be serviced by the API gateway 120 of the issue tracking platform 116.

In some cases, the API gateway 120 authenticates the user and/or the request using the authorization manager 118. The API calls include user account information received from the client device(s) 102a-d that is used by the authorization manager 118 to authenticate the user and allow access to the issue tracking platform 116 (e.g., a database of the issue tracking platform and other platform services). The authorization manager 118 may issue a token or other authentication credential that can be used by the issue creation and interpretation service 114 to access data and services on the issue tracking platform 116. In some implementations, all data and service requests are routed through the authorization manager 118 to ensure that the API calls are originated from an authenticated source. The data and services that are provided by the issue tracking platform may be restricted to users having a registered account (authenticated using one of the techniques described above) and having an appropriate set of permissions, which may be defined by the type of registered account or user-specific access protocols. Generally, for purposes of the following examples, the user may have at least "view" or "read" permission. Users without an account and/or without the appropriate set of permissions to the issue tracking platform may not be able to use the issue creation service.

When the issue is created, the graphical object is replaced as a selectable graphical object corresponding to an issue object in the issue tracking platform within the unstructured canvas. For example, the user may select to view the selectable graphical object as an issue card with summarized information of the issue object, the user may also elect to continue viewing the selectable graphical object as the native graphical object (e.g., as a sticky note or as the initial graphical object), and so on. Regardless of the view of the selectable graphical object, the object can include a link that directs the user to the issue tracking platform to view the issue object. While the selectable graphical objects corresponding to the issue object are concurrently displayed to users in the whiteboard, the metadata and/or issue content displayed depends on the user's permission profile with respect to the issue tracking platform or the issue content. For example, users that do not have the appropriate permissions credentials may not be displayed any data from the issue object (e.g., display of the issue content may be suppressed). In other examples, issue content may be displayed in accordance with the permissions profile of a user. For example, certain users with administrative privileges may be displayed additional issue information compared to other users. In some embodiments, when a user selects the selectable graphical object, an "EDIT ISSUE" option may be displayed. Similar to explained above, the whiteboard frontend application may display an editable window and, in accordance with a user modifying at least one field, an API call may be generated to edit the issue.

Back to the client application 104, the virtual whiteboard 108 user interface may include a compressed menu. The compressed menu provides a wide range of user controls in an efficiently so that users do not have to refer to top menus and/or side panels to change the look of a graphical object. In some examples, the compressed user menu is provided as a floating window adjacent to the selected graphical object and/or the cursor such that a user can refer to the menu with minimal travel of the cursor. However, in some embodiments, the compressed menu may be fixed with respect to the unstructured canvas region. The compressed menu service 122 may be configured to generate the compressed user menu. In particular, the compressed menu service 122 identifies the graphical object content and type selected by the user. Based on the graphical object content and type, the compressed user menu displays a window with a fixed number of user controls. Each user control may represent a category of controls and may have an additional expandable menu or auxiliary selectable control. Each user control has a key indicator to indicate to the user the category of items that may be selected. For example, for a graphical object having text, a category of user controls may include bullet points. The expandable menu or auxiliary selectable control may include outlines, numbered items, and different types of bullets. Before selecting an option, the key indicator may be bullets. As a user modifies the graphical objects, for example by adding numbered lists, the compressed menu service 122 updates the key indicator to display a numbered item key indicator. The key indicator change may also refer to changes in shading, bolding, highlighting, color changing, and so on, which indicates to the user that the item is selected.

In some embodiments, the compressed menu service 122 may generate compressed menus unique to each graphical object. For example, in the numbered list example, a first user may select a range of text formatting options such as a numbered list, bolded text, and Century Schoolbook font for a graphical object. Upon a second user selecting the same graphical object, the compressed user menu may be displayed with the first user's selection, regardless of the second user's default options. As a result of this configuration, a user may quickly visualize and/or reproduce the formatting of another user's work.

More generally, the system 100 depicted in FIG. 1 may include multiple client devices 102a-d operable to access a client application 104 (e.g., content collaboration platform), an issue tracking platform, a videoconferencing application 124, and other platforms and/or services. In some embodiments, the client devices 102a-d access these platforms via a computer network (not shown). The client devices may be mobile devices, tables, laptops, desktops, or any other suitable device operable to connect to a computer network. Each client device may include a processor and a memory. The processor may be any suitable computing device or logical circuit configured to execute one or more instructions to perform or coordinate one or more operations on or to digital data. In many embodiments, the processor or processors of the client devices may be a physical processor, although this is not required of all embodiments; virtual components may be suitable in some implementations. Similarly, a memory of the client device may be configured and/or implemented in a number of suitable ways and may be partially or completely virtualized.

In typical examples, the processor of the client devices 102a-d is configured to access at least one executable asset from the memory of the client devices 102a-d. More particularly, the processor of the client devices 102a-d may be configured to access a data store portion of the memory to load, into a working portion of the memory, at least one executable asset or executable program instruction. In response to loading the instruction or executable asset into working memory, the processor of the client devices 102a-d may instantiate an instance of software referred to herein as a client application.

In many embodiments, a client application (also referred to as a "frontend") may be configured to provide client-side functionality of a software platform (a documentation or content creation service or other collaboration platform). More specifically, the client application may be configured to communicably couple to a separate instance of software executing on, and/or instantiated by, a host system or server configured to provide server-side ("backend") functionality of the content collaboration platform and/or the issue tracking platform (e.g., documentation or content creation service). In this manner, a documentation or content creation service is defined in part by a frontend executing/instantiated on a client device and in part by a backend executing/instantiated on a host server in communication with the frontend.

In this example, the server supporting the backend is configured to operate within, or as, a virtual computing environment that is supported by one or more physical servers including one or more hardware resources such as, but not limited to (or requiring) one or more of: a processor allocation; a memory allocation (also referred to as a working memory); non-volatile storage (also referred to as persistent memory); networking connections; and the like.

Further, it may be appreciated that although referred to as a singular "server", a host server supporting the backend may be a cluster of different computing resources, which may be geographically separated from one another. In this manner, because specific implementations may vary, both the host server and the client device 102 can be referred to, simply, as "computing resources" configured to execute purpose-configured software (e.g., the frontend and the backend).

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

These foregoing embodiments depicted in FIGS. 2A-6 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

FIGS. 2A-2F depict examples of a graphical user interfaces (GUI) of the whiteboard (e.g., such as virtual whiteboard 108) that can be used to create an issue object in the issue tracking platform. As depicted in the figures, a virtual whiteboard platform may include a user interface within the unstructured canvas region that can import and export content items from the issue tracking platform, generate suggestions for issue fields (e.g., issue type, project, and so on), and create issue objects in the issue tracking platform.

Figure 2A:
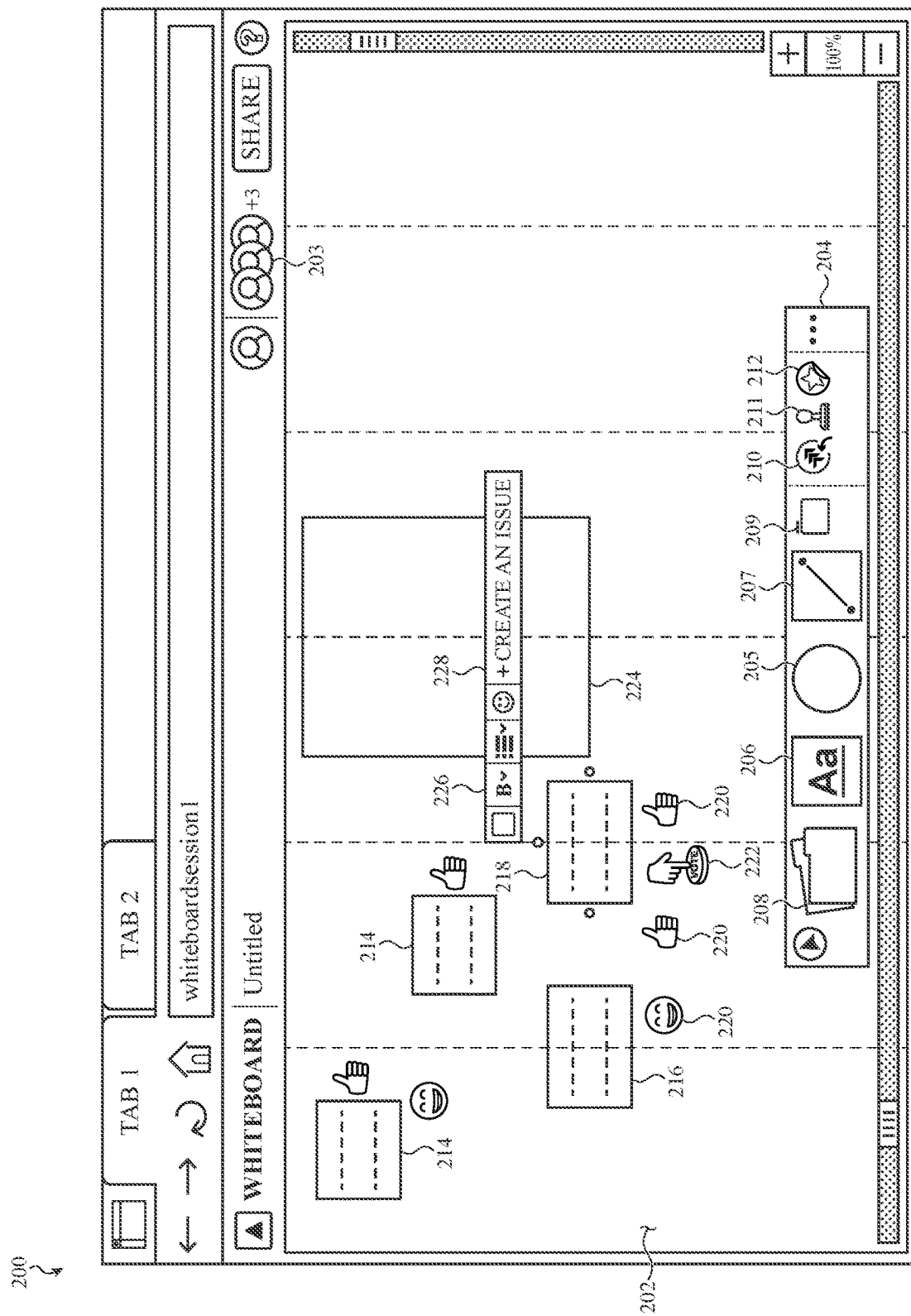
FIGS. 2A-2F depict an example graphical user interface used to create new issue objects.

As shown in FIG. 2A, a whiteboard interface 200 has an unstructured canvas region 202. As explained above, the unstructured canvas region 202 allows users to freely add, delete, and edit graphical objects, handwrite, draw, and so on. The unstructured canvas 202 can be accessed by multiple users concurrently (e.g., in real time). In some embodiments, the canvas region 202 takes up a significant space of the interface in order to provide users a broad view of the region. As a result of this configuration, the whiteboard interface 200 may include fixed user menus, quick access menu or primitive bar 204, and active users elements 203.

Due to the collaborative nature of the whiteboard, the user interface includes features that allow users to see who is collaborating on the canvas. For example, the active users element 203 displays the number of users actively on the whiteboard (e.g., viewing, editing, adding, and so on). The active user elements 203 may be displayed as a side panel, a top panel, and so on, and may include a summary of the users (e.g., number of users within the platform). In some embodiments, the active user menu may display pictures, avatars, or any other identifying information. While users are actively on the platform, the cursor of each user may be displayed in the canvas. The cursors may include the name of the user. In some embodiments, the cursor includes pictures, avatars, or different colors to differentiate users. A user may click on the identifying information (e.g., over the cursor or over the active user elements 203) of a user to start a chat or to retrieve that user's profile.

The quick access menu or primitive bar 204 is configured to provide the user quick access to graphical objects. For example, a user may select one or more native primitives from the quick access menu or primitive bar including, without limitation, shapes 205, text boxes 206, lines 207, sticky notes 208, regions 209, issue creation options 210, stamps 211, and emojis 212. For example, graphical objects 214 may include note objects (e.g., virtual sticky notes), graphical object 216 may be a shape, and graphical object 218 may be a text box. Similarly, users can place emojis, such as emojis 220 and stamps, such as voting button 222. As explained in FIG. 5 below, users may also place regions, such as region 224, within the canvas which creates a sub-canvas within the whiteboard, allowing users to have more control over a region, move graphical objects within the region together, and/or block other users from moving content. Each graphical object from the quick access menu or primitive bar 204 can be placed freely (e.g., no restriction on locations, no restrictions about overlaps of existing objects, and so on) within the unstructured canvas. As users place objects in the canvas, the visible size of the canvas expands (e.g., in a 2D plane) to accommodate the content.

As illustrated in the figure, a floating user menu 226 may be displayed as a result of a user selection of a graphical object, such as graphical object 218. The floating user menu 226 has a variety of user controls, depending of the content and/or primitive of the graphical object. For example, the floating user menu 226 may include text format options, color changing options, emojis, and a "CREATE ISSUE" button 228. Using this interface, a user may quickly identify if an issue object should be created from the graphical object. In some embodiments, the "CREATE ISSUE" button 228 is selectively displayed depending on the content of the graphical object, primitive, and/or any other suitable criteria. For example, in response to a user selection of a sticky note without text, display of the "CREATE ISSUE" button may be suppressed. Similarly, in some embodiments, UI block types or primitives, such as lines, may not display a create issue option. In some examples, the primitive may be used to determine the issue type, project, and/or other issue fields. For example, a user selection of a line may be identified as a link of two existing issue objects. As another example, a user selection of a sticky note may be analyzed as a likely action item and the display of the issue creation window may be updated accordingly.

Figure 2B:
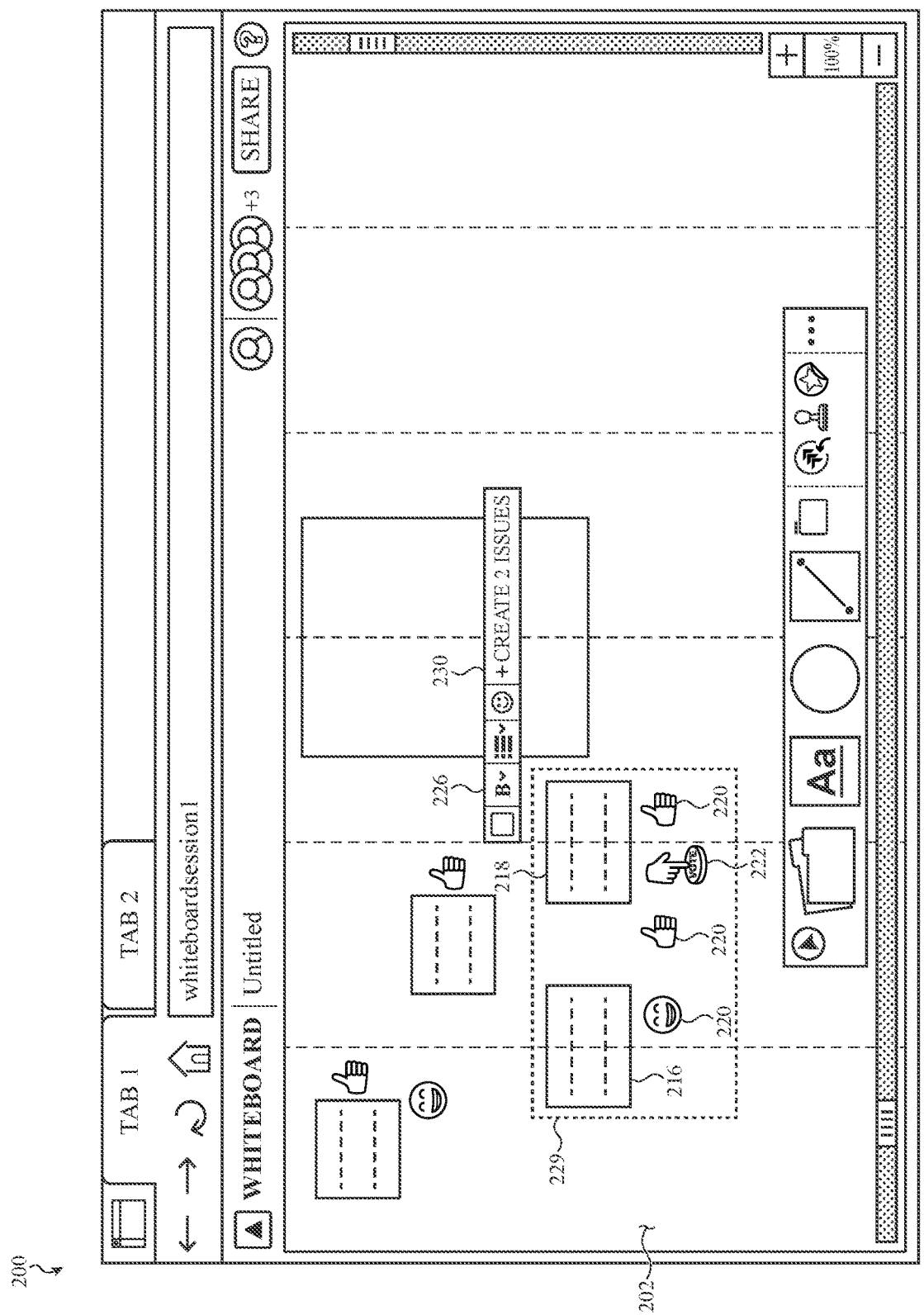

FIG. 2B depicts the GUI 200 from FIG. 2A with a different user selection. In this view, the user selects or defines an area or sub-region 229 of the canvas which includes multiple graphical objects. For example, area or sub-region 229 includes a selection of graphical objects 216, 218, 220, and 222. In this example, graphical objects 216 and 218 comprise text. By contrast, graphical objects 220 (emojis) and 222 (sticker) do not have user generated text. In response to a user defining the area or sub-region 229 (e.g., by clicking and dragging the cursor from a first corner of the area to a caddy corner), each graphical object (e.g., 216, 218, 220, and 222) may be selected. Each selected graphical object may be analyzed to identify a set of candidate objects may satisfy a selection or content criteria and, thus, may be used to create an issue object. For example, each graphical object may be analyzed to determine if the object comprises user-generated text or otherwise contains user-generated content that can be extracted for creation of an issue object. In some embodiments, handwritten text may be recognized and converted to a string (e.g., via optical character recognition). In other embodiments, the content of the user generated text may be analyzed in accordance to the selection criteria to determine if there is sufficient information to generate the issue object. For example, a text box containing a single letter and/or unintelligible content may be discarded as an issue creation candidate. Similarly, the object type, primitive, or block type may be analyzed to determine if each of the selected objects is within a predetermined library of graphical objects that may be used to create issue objects. For example, emojis and/or stickers may not be within the issue creation candidates. The floating menu 226 may be displayed with the "CREATE ISSUE" button 230. In some embodiments, the "CREATE ISSUE" button displays the number of issue objects to be created based on the number of graphical objects that satisfy a criteria. For example, from 6 candidate objects shown in the figure, 2 graphical objects satisfy the option creation criteria (e.g., a content criteria).

Figure 2C:
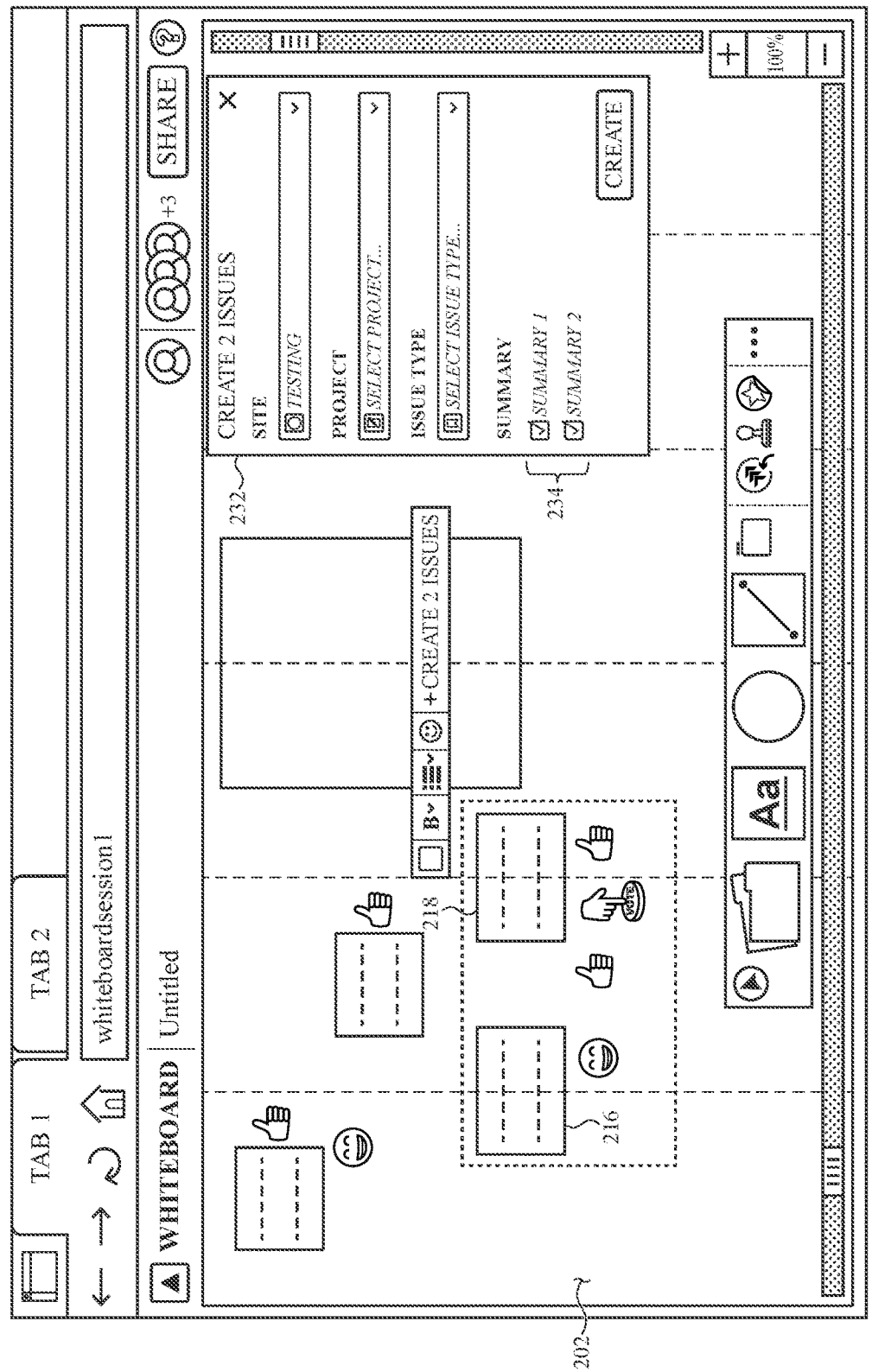

Once the set of candidate objects are selected for issue creation, as described above, the content of the selected objects may be extracted and analyzed. This analysis can be used to predict and/or populate fields within the issue creation window, determine if a same or similar issue has already been created, and/or provide content suggestions for the issue object based on similar issues in the issue tracking system. FIG. 2C depicts a view of an issue creation window 232 that is displayed once the "CREATE ISSUES" button is selected. Upon receiving the "CREATE ISSUES" request, the server may retrieve a set of fields from an issue tracking system corresponding to issue fields defined by an issue type or default content format. The server may also query the issue tracking system to obtain existing issues in the platform satisfying a query or other criteria. The issue creation window 232 may be presented as a user interface (UI) form, where a user can fill out fields of the form, choose items from drop-down menus, and/or confirm prepopulated items. In some embodiments, the issue creation window 232 may be an initial issue creation window, which shows a suggested Site, Project, and/or issue type. The issue creation window 232 may also give a user the selection 234 of candidate issues to be created. A user may deselect certain candidate issues. For example, from the two candidate issues from graphical objects 216 and 218 to be created, the user may deselect the content from 216. As a result of this configuration, a user can select a wide area in the canvas 202 to create an issue object and deselect unwanted graphical objects more easily compared to individually selecting only the graphical objects for the issue objects that the user wants to create.

Figure 2D:
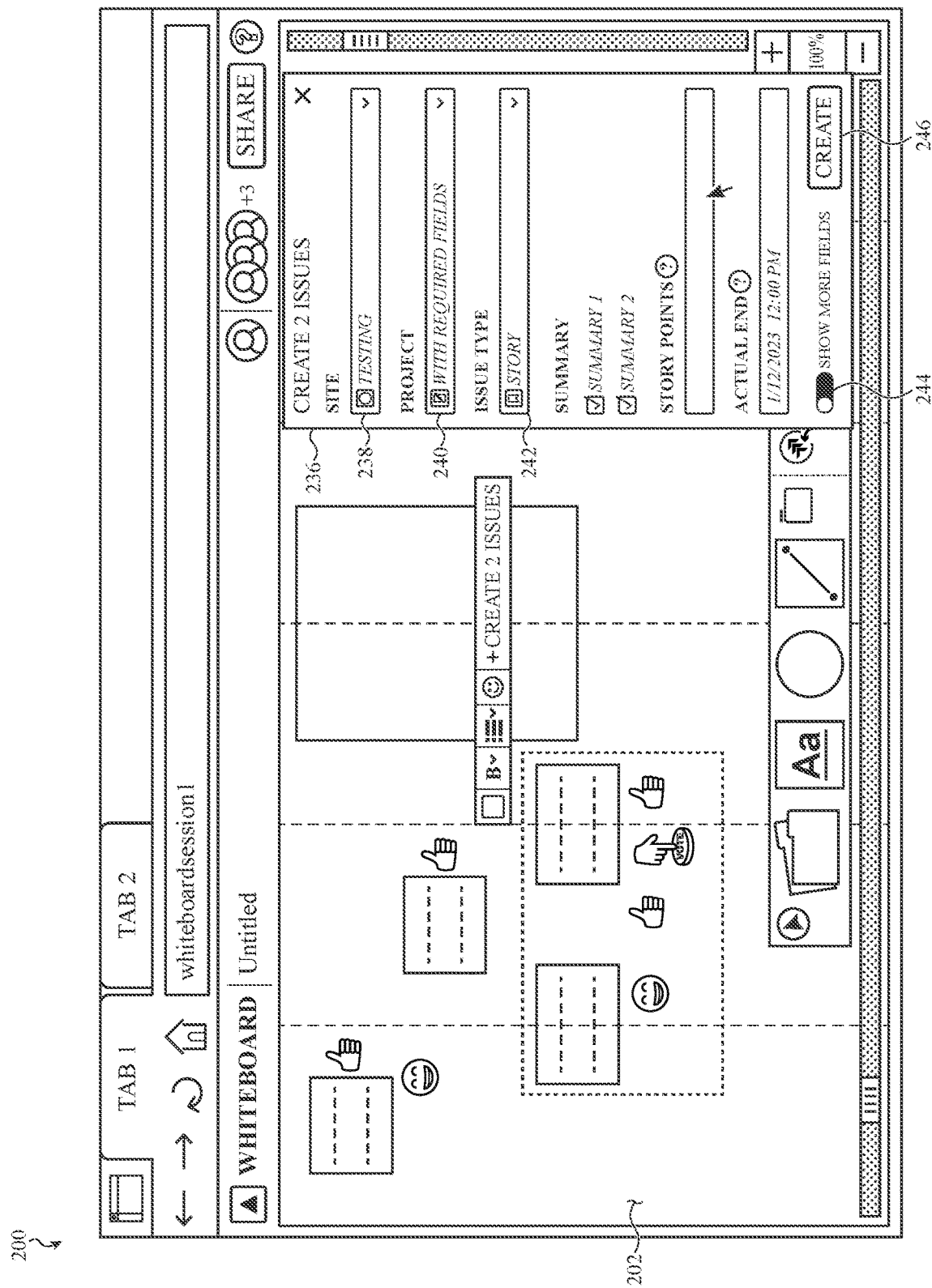

FIG. 2D depicts an example issue creation window once the issue creation candidates have been confirmed by the user. The example is shown for illustration purposes and it is not intended as a limiting step in creating an issue. For example, in some embodiments an issue creation window may be displayed without the option to select and/or deselect candidate issues. As depicted in FIG. 2D, based on which issues the user elects to create, a second issue creation window 236 is displayed. As explained above, the issue creation window 236 may also be referred to as a UI form or an issue creation form. In some embodiments, the second issue creation window 236 includes the minimum required fields to create an issue, such as fields 238, 240, and 242. The issue creation window 236 can also include an option to show more fields 244 (e.g., non-required fields available on the issue tracking platform). In response to receiving a user's request to create the issues (e.g., through button 246) an API call may be generated causing an issue to be created in the issue tracking platform. In other embodiments, a set of minimum required fields from the first of fields of an issue creation platform is obtained. In response to receiving the user confirmation input, whether each field of the set of minimum required fields has an entry in a corresponding editable region of the set of editable regions may be determined. In accordance with a field of the set of minimum required fields having null data, the confirmation input may be temporarily disabled.

In some embodiments, each field (e.g., fields 238, 240, and 242) may be prepopulated based on an analyzed portion of the graphical object's content. For example, a database of the issue tracking platform may be queried to obtain a set of existing issues. A backend application may conduct a semantic similarity analysis of the existing issues with respect to at least a portion of the content of the candidate graphical objects and suggest a set of issue types, projects, or other fields based on those existing issues satisfying a criteria. The set of suggested and/or prepopulated fields may be based on the user's issue creation history and/or role. In another example, the fields may be prepopulated based on context data. For example, the whiteboard's hierarchical location within the content collaboration platform can be used to suggest a project field based on which space of the content collaboration platform where the whiteboard session is saved. As another non-limiting example, the backend server may consider the semantic similarity, user's issue object creation history, and/or the hierarchical location within the content collaboration platform combined to provide a suggestion.

The system may also extract context data from the virtual whiteboard to generate a suggestion. Context data refers, as non-limiting examples, to the data from the virtual whiteboard and/or content collaboration platform such as users in the session, roles of the users in the session, meeting title, meeting subject, content from the non-selected items, space and/or page location (e.g., hierarchical location) where the virtual whiteboard is saved, and so on. For example, the context data may be used to infer a project of the issue tracking platform based on the space where the whiteboard is saved. As another example, emojis surrounding a graphical object or primitive may be used to infer a sentiment to be added to the issue tracking platform. As another example, based on users in the session, assignees of an issue may be suggested. The assignees may be ranked based on their role and the issue type of the issue being created.

Figure 2E:
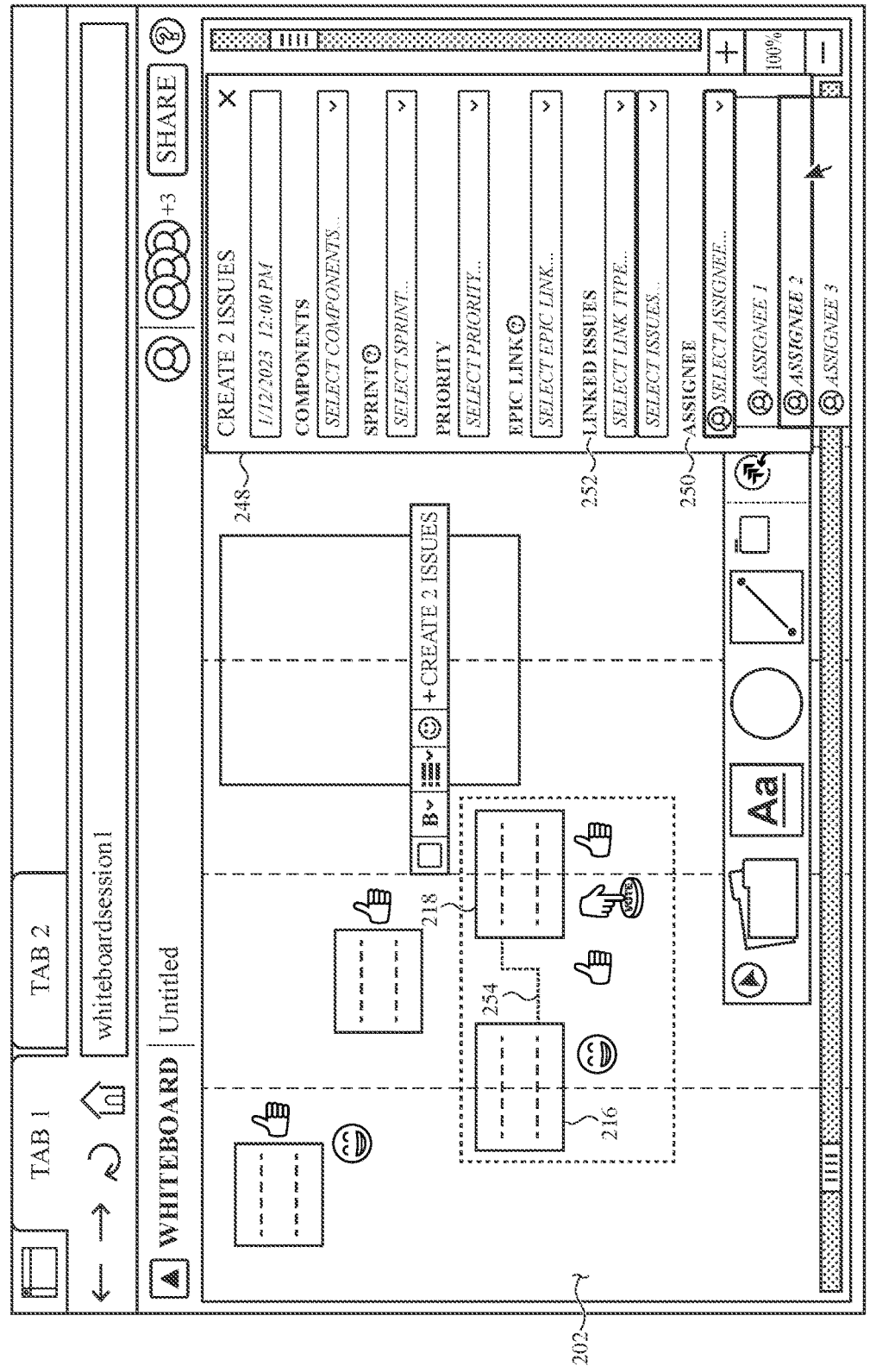

FIG. 2E shows an issue creation window 248 with an expanded number of issues (e.g., through selected the "SHOW MORE FIELDS" option 244 from FIG. 2D). Issue creation window 248 displays the total number of fields available in the issue tracking platform. In some embodiments, the expanded number of issues displays the most commonly used fields of the issue tracking platform. As depicted in the figure, the issue creation window 248 may include an assignee option 250. The assignee option 250 includes, in some embodiments, a list of the assignees recently designated by a user, a predicted list of assignees based on the issue type, project, issue descriptions, or any other criteria. The expanded issue creation window 248 may also include an linked issues option 252. The linked issues option 252 can be a drop-down menu that includes similar and/or related issues. A user can establish a relationship (e.g., blocks, precedes, and so on) between the issue object being created and existing issue objects. In some cases where issue objects are created as a bulk action, the linked issues options 252 may be displayed to link issues objects being created together. In some embodiments, the linked options may be prepopulated. For example, graphical objects 216 and 218 may be connected by line 254. Based on line 254, the backend application may determine that the issues are linked and populate the fields of the linked issues option 252 according to this determination.

Figure 2F:
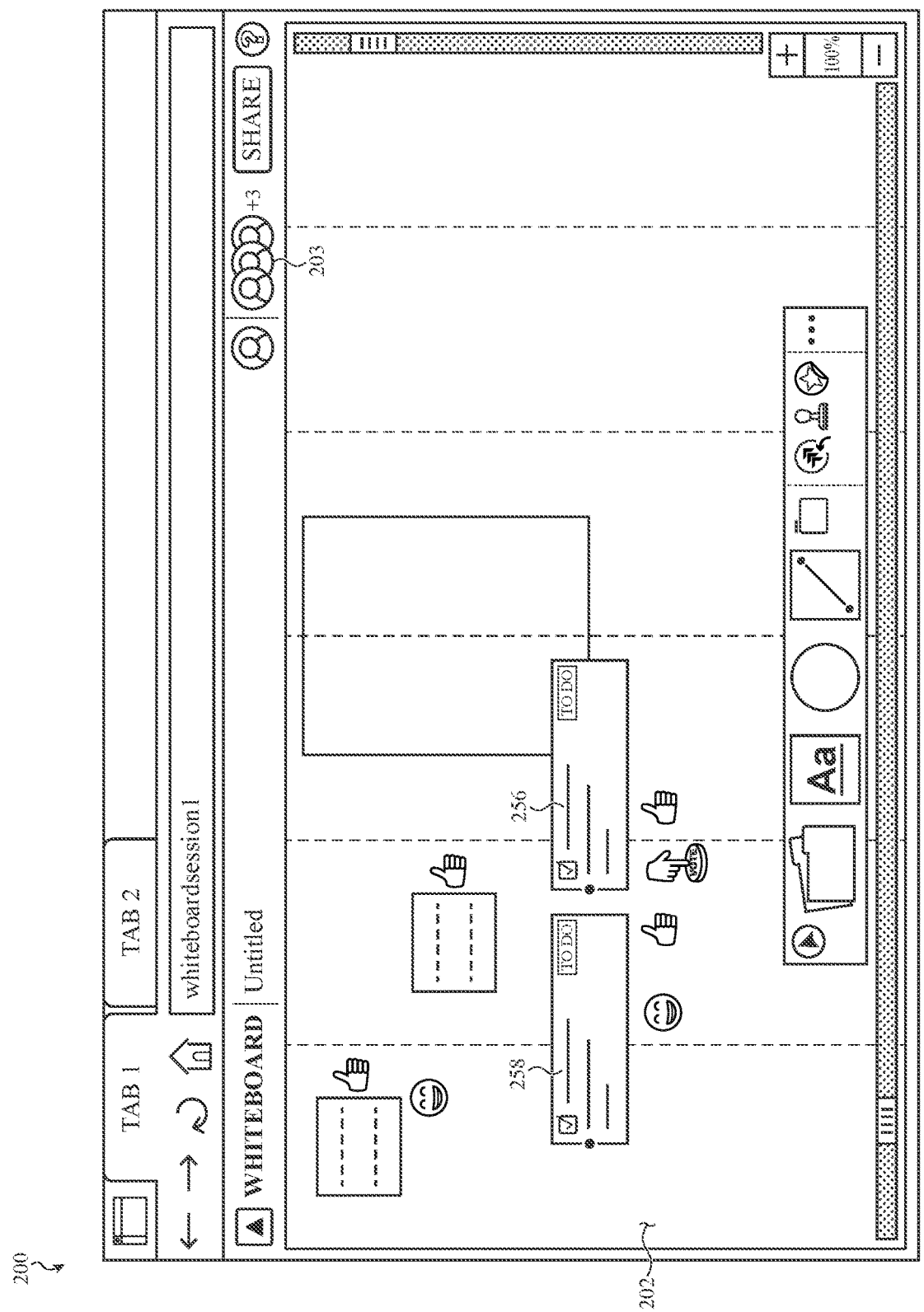

FIG. 2F shows an example view of the created selectable graphical objects corresponding to issue objects in the issue tracking platform. In this example, graphical objects 218 and 216 have been replaced by selectable graphical objects 256 and 258, respectively. As shown in the figure, selectable graphical objects 256 and 258 display as issue cards within the unstructured canvas region 202. The issue cards include display metadata from the issue object, such as status, last updated, assignee, and/or a summary. The issue card may include a link and, in response to a user selection of the link, the user may be directed to the issue tracking platform. The selectable graphical objects 256 and 258 (e.g., which correspond to issue objects in the issue tracking platform) may include alternative displays, such as being displayed as a native graphical object or displaying the issue using a customized set of parameters. In some examples, selectable graphical objects may include embedded content extracted from the issue object, which may include graphics or an inline frame of the linked target. In response to a user selection of the issue object, an instance of the issue tracking platform may be instantiated, see FIG. 6 discussion below for an example graphical user interface of the issue tracking platform.

In some embodiments, the content from the issue object may display differently to different users in accordance with the authentication status of each user. For example, users without the appropriate credentials to access the issue tracking platform may not see any content in the selectable graphical object (e.g., the data from the issue content is not extracted and the display of the content of the selectable graphical object is suppressed). In another example, users with administrative privileges (or any other high access level credentials) may be displayed additional information extracted from the issue object. A system may retrieve a permissions profile for each user and display the content of the issue object in accordance with the user's permission profile.

Figure 3A:
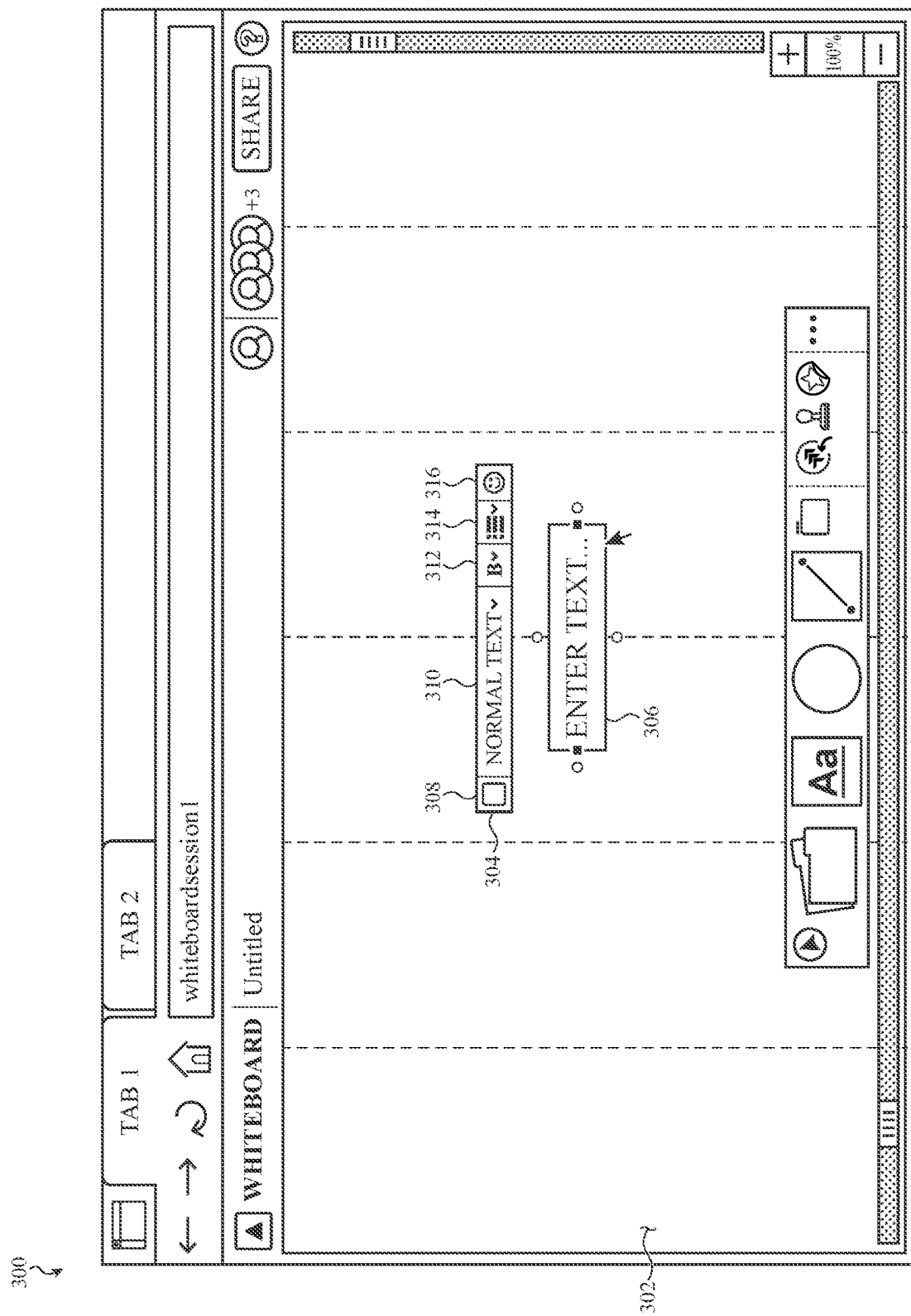
FIGS. 3A-3D depict an example graphical user interface used to generate compressed user menus.
Figure 3B:
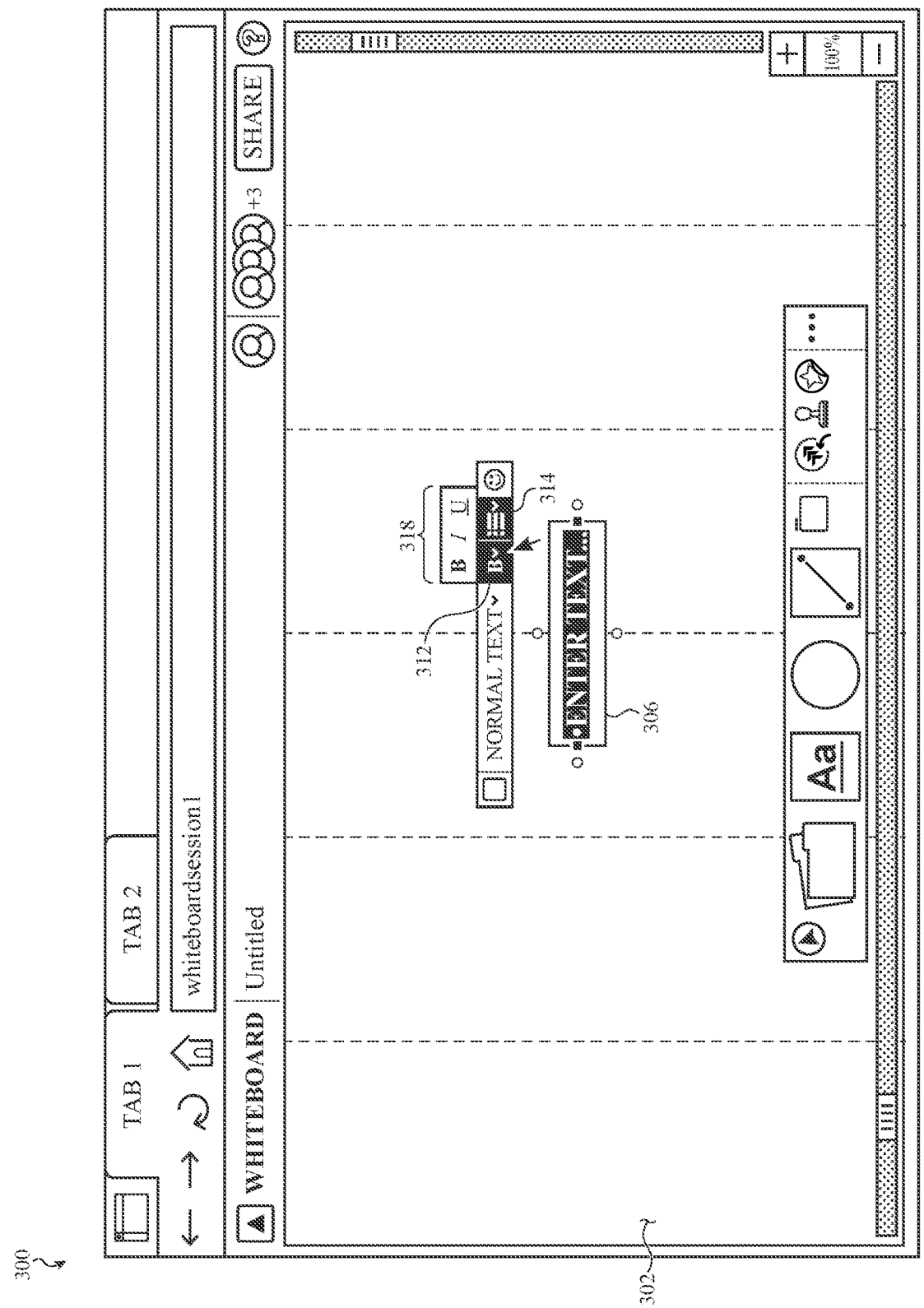
Figure 3C:
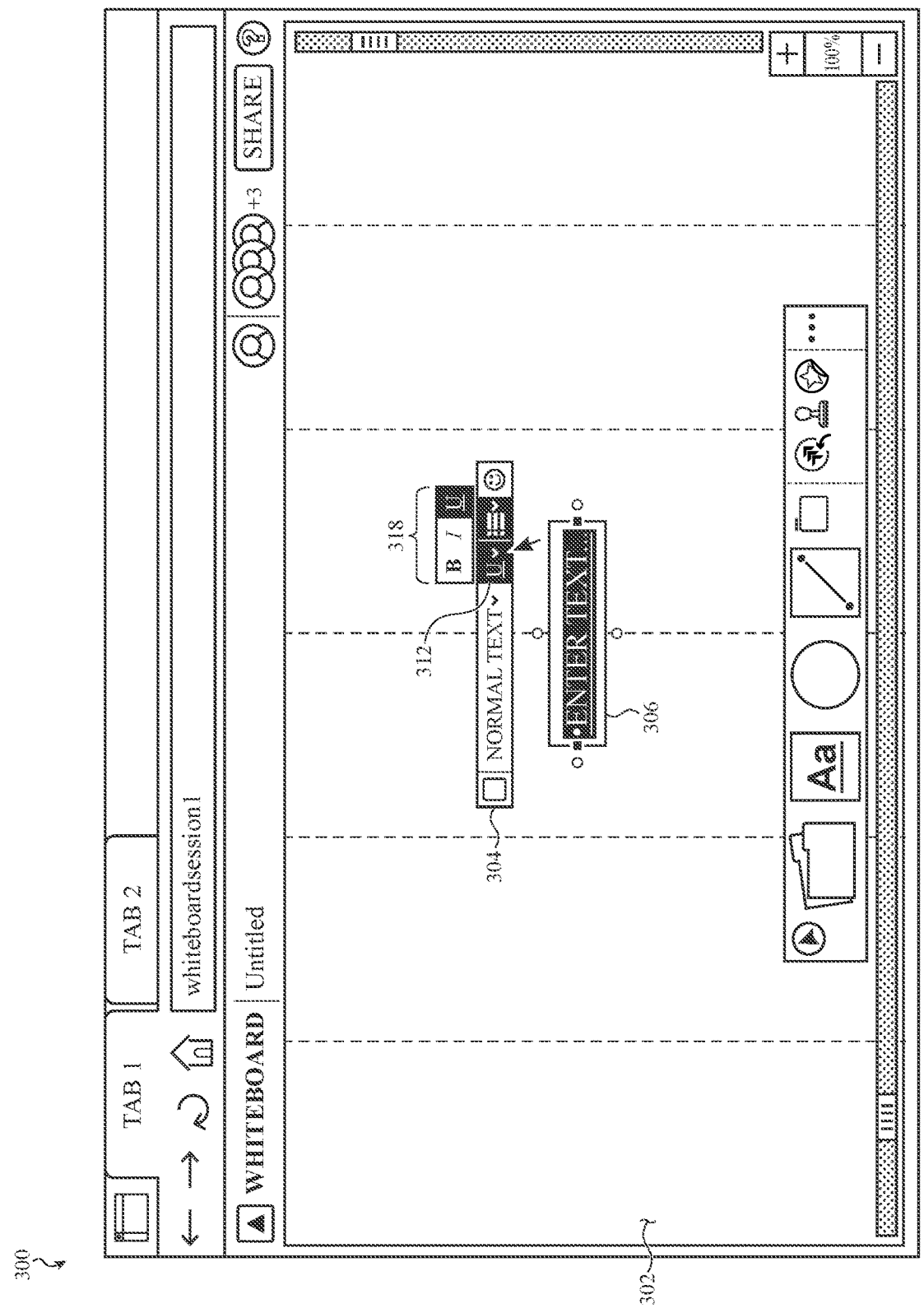
Figure 3D:
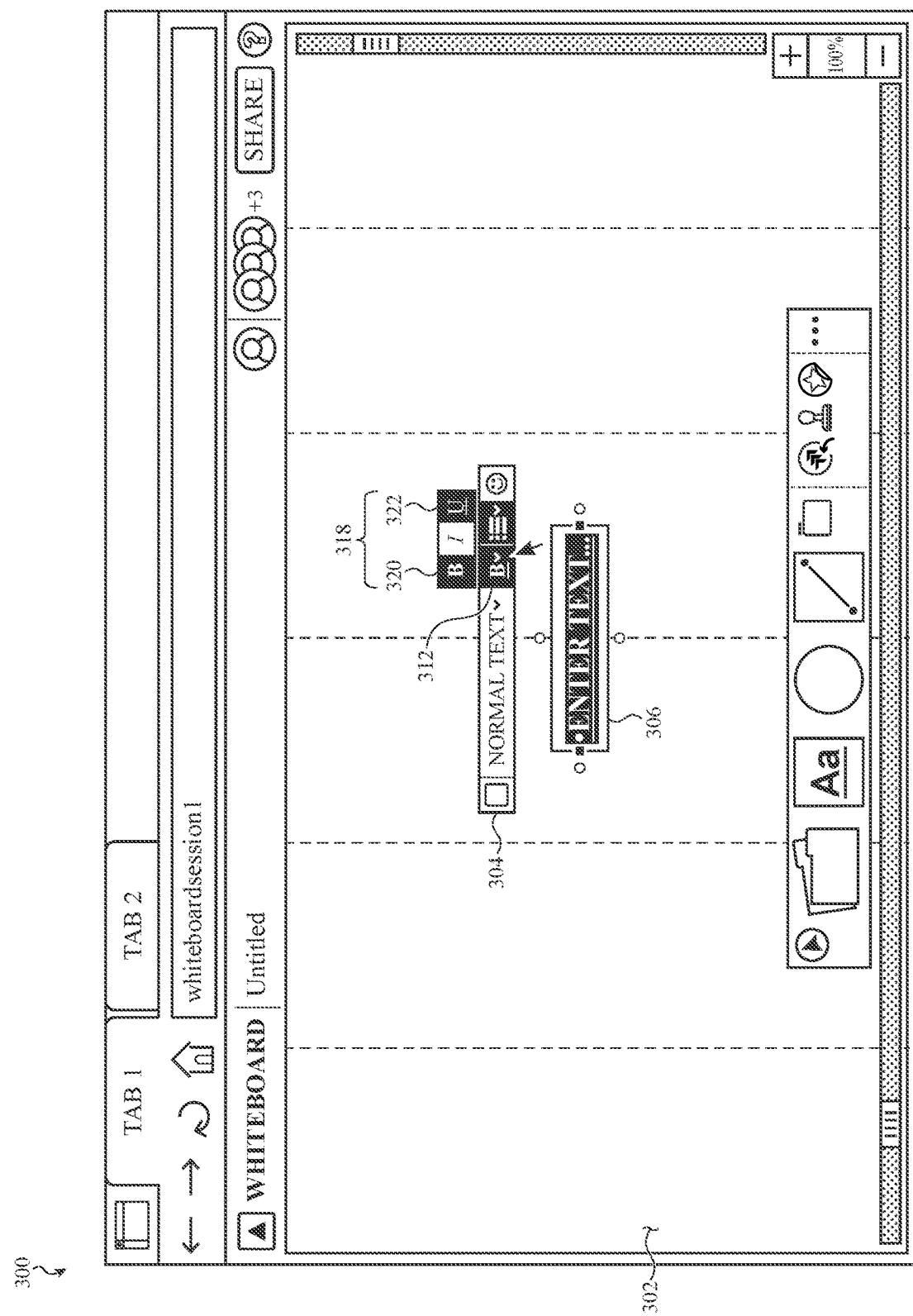

FIGS. 3A-3D depict examples of compressed user menus configured to provide users with quick access to user controls while reducing the footprint required for displaying user control elements. As discussed previously, the graphical user interface 300 includes an unstructured canvas 302. As depicted in FIG. 3D, a compressed user menu 304 is displayed in response to a user selection of a graphical object 306. The compressed user menu 304 may be a floating window, a pop-up window, it may be placed in a top menu, a side menu, or any other user interface menu as may be known to one of skill in the art. While the graphical object 306 shown is a text box, the foregoing examples are applicable to other graphical objects (see, e.g., FIGS. 4A-4D). The user control menu may be displayed in response to a user selecting a single graphical object or multiple graphical objects (e.g., by selection an area within the unstructured canvas region). In response to the selection, the object primitive type may be identified for the graphical element selection. The object primitive type may refer to different object primitives within the whiteboard, such as lines, sticky notes, shapes, regions, and so on. Based on the object primitive type, the different user control menus may be displayed. For example, a compressed user control menu for a line may have different user controls (e.g., line thickness, line color, and so on) than a user control menu for a sticky note (e.g., color, font size, font type).

The compressed user menu 304 comprises a user controls. The user controls may be displayed as a horizontal array. However, this view is non-limiting. In some examples, the user controls may be displayed as a vertical array or any other array configuration. In the example depicted, compressed user menu 304 has five user controls: 308, 310, 312, 314, and 316. Each of the user controls 308, 310, 312, 314, and 316 may represent a graphical object format category. For example, user control 308 allows a user to change text color, user control 310 allows the user to change font, user control 312 allows the user to change the font style of the text, user control 314 allows the user to add bullets and/or change the bullet style, and user control 316 allows the user to access the emoji menu and select an emoji.

In some embodiments, the size and/or number of displayed user controls may be determined based on an available display area of the canvas. For example, in accordance with receiving a user selection of a primitive, the system may estimate the available display area. The available display area estimate may be based on the number of primitives displayed on the canvas, the screen size of the user, the size of the selected primitive, and so on. In accordance with the available area, the compressed menu may be used. In some examples, in accordance with a large available area, a full menu (e.g., not compressed) may be displayed. In some examples, the size of the compression menu may be increased or decreased in accordance with a respective range of available area. In other embodiments, the size of the user-compressed menu may be user-defined.

In some embodiments, each of the user controls 308, 310, 312, 314, and 316 has a corresponding key indicator. For example, the change text color control 308 has a key indicator corresponding to the color of the text. Font control 310 has a key indicator corresponding to the font of the text. User control 312 (e.g., font style indicator) has a key indicator corresponding to a font style and/or unselected font style. Bulleted list user control 314 has a key indicator corresponding to a bullet style of the text. Emoji user control 316 has a key indicator corresponding to the first emoji in a list, for example. In some embodiments, the key indicator shown may correspond to the last user control selected by the user in each category. In some cases, a user control option may not be selected for a category (e.g., the text may have its default formatting) and, thus, the key indicator is displayed an unselected and/or highlighted. In the example depicted, the text from 306 does not have a font style and the corresponding key indicator for user control 312 does not show a highlighted and/or selected font style. Instead, a first font style of the font style options may be displayed. This example is presented for illustrative purposes only. In some embodiments, a key indicator may be presented in accordance to alternative criteria.

As depicted in FIG. 3B, the user controls may include an expandable menu or an auxiliary selectable control which provides a user with expanded formatting options. The auxiliary selectable control 318 may appear in response to a user selection of a user control expansion request. In the figure example, the font style user control menu is expanded to display font style user controls, such as bold, italics, and underline. The user may select a font style, such as bold and, as shown in the figure, the key indicator for the font style user control 312 is updated to reflect that the user has selected a bold font style (e.g., the key indicator may show as a bolded B, the key indicator may change shades and/or colors, and so on). Similarly, in response to receiving a user selection of the bulleted list, the key indicator of the bulleted list user control 314 may be highlighted, shaded, or the visual look of the key indicator is updated.

FIG. 3C shows another example of how the key indicator of user controls updates in accordance with a user selection of a formatting option. In particular, FIG. 3A-3B shows the key indicator of the text format as a "B" (e.g., indicating bold font style as the default key indicator). FIG. 3C shows the key indicator of the user control as "U" (e.g., underline). In response to a user selection of a format option within the compressed user menu 304 (or expanded menu 318), the key indicator updates in accordance with the user selection. In this example, in response to a user selection of the underline font style, the text format of graphical object 306 (e.g., a text box) and the key indicator of user control 312 is updated. The key indicator may also display as shaded, highlighted, or any other visual indicator that a format option is being applied to the text box.

FIG. 3D shows an example of how the key indicator of user controls updates in accordance with a user selection of more than one formatting options within a single category. In this example, a user selects a first text format option 320 from the auxiliary selectable control 318. In response to receiving the user selection, the format of the graphical object 306 may be updated to display the format of the selected object in accordance with the user selection. The key indicator updates to reflect the text format option 320. Next, a user may select a second text format option 320 from the auxiliary selectable control 318. In this example, the user does not deselect the first text format option 320. In response to receiving the second user selection, the format of the graphical object 306 may be updated in accordance with the user selection. Similarly, the key indicator of the user control 312 is updated to display the key indicator as a composite of the first format option 320 and the second format option. The composite may show the last format option selected as modified by the first format option. In the example depicted in the figure, the key indicator is shown as "B" (e.g., an underlined bold key indicator). By visualizing the text formats via a composite key indicator, users in the whiteboard can easily determine formats of graphical objects with the compressed user menu 304 without clicking to the auxiliary selectable control 318. In other words, a user menu may have multiple levels. The first level may be a compressed user menu 304 and expanding the user controls to the auxiliary selectable control (e.g., via a drop down menu) displays a second level of user menus. In this hierarchy, the size of user menus can be reduced, thereby leaving more visual space in the unstructured canvas 302.

In some embodiments, the compressed user menu may be displayed for multiple graphical objects. In this example, the user may select an area or multiple graphical objects. In response to the user selection of the multiple (or at least one) graphical object, the object primitive type may be identified. The system may select a compressed user control menu having a set of user-selectable controls that are associated with the identified object primitive types. This menu control may be displayed as a horizontal array of user-selectable controls. As explained above, each of the user-selectable controls has a corresponding key indicator. For example, a first user-selectable control may have a first key indicator corresponding to a first format option. In response to a user selection of the first user-selectable control, the first format option may be applied to the graphical object. In some cases, the first key indicator may be updated in accordance with the user selection. In some embodiments, the first key indicator is updated by shading and/or highlighting the key indicator (e.g., to show that the format option changed from deselected to selected). In some cases, in response to a user deselecting the format option, the format is removed from the at least one graphical object and vice versa, in accordance with the respective format option not currently being applied, selecting a user-selectable control applies that format option. In response to receiving a second user selection of an element of the menu control (e.g., a drop down menu by the key indicator), an auxiliary menu control may be displayed. The auxiliary menu control may display additional options of the user-selectable control. For example, the user-selectable control may represent formatting categories and the auxiliary menu expands those options. The auxiliary menu control may include another horizontal array of user-selectable controls. In response to a user selecting a second user-selectable control from the auxiliary menu representing a second format option, the second format option is applied to the at least one graphical object. Also, because the user-selectable control of the first array has two different formatting options selected, a composite key indicator is generating having the first format option combined with the second format option. Once a user-selectable control from the auxiliary menu is selected, the auxiliary menu may be removed from display.

In some embodiments, the user selectable menu 304 includes integration options with other platforms. For example, the user-selectable menu may include an issue creation option, such as the issue creation option described in FIGS. 2A-2F above. The issue creation option may be displayed as a first-level user control. In response to a user selection of a drop down arrow with the issue creation option, an expandable menu or auxiliary selectable control may be display additional functional features with respect to the issue creation platform, for example. As a non-limiting example, the expandable menu or auxiliary selectable control may include an option to replace the graphical object or primitive with an existing issue. As another example, the expandable menu or auxiliary selectable control may include an option to launch an instance of the issue tracking platform. As explained with respect to FIG. 2A-2F above, in response to a selection of a region within the canvas, the system may identify a set of candidate objects. In some embodiments, the user expandable menu or auxiliary selectable control includes additional options to create a single issue or to generate an issue object or bulk action to create a set of issue objects. The user selectable menu 304 may also include options for third party integration. For example, the user-selectable menu 304 may include options to import calendars, insert links, insert audiovisual objects, and so on. The third party links may be generated using a portion of the content of the graphical object or primitive. In response to a user confirmation of the content to be imported and/or embedded (e.g., through a similar window as explained in the issue tracking context), the graphical object or primitive may be replaced with the third party object. As another example, the user-selectable menu 304 can include an option to create a page or to access a page in a content collaboration platform based on the content of the graphical object. The user-selectable menu 304 may also include an option to create a contact card at a third party platform's database based on the content of the graphical object. As yet another example, a graphical object may have dates in a table. A third-party integration option may include exporting those dates and corresponding data in general into a calendar (e.g., a schedule, a calendar of events, or meeting invites). Each option in the user-selectable menu 304 for third-party platform functionality may be displayed based on the content of the graphical object, user preferences, or other criteria.

Figure 4A:
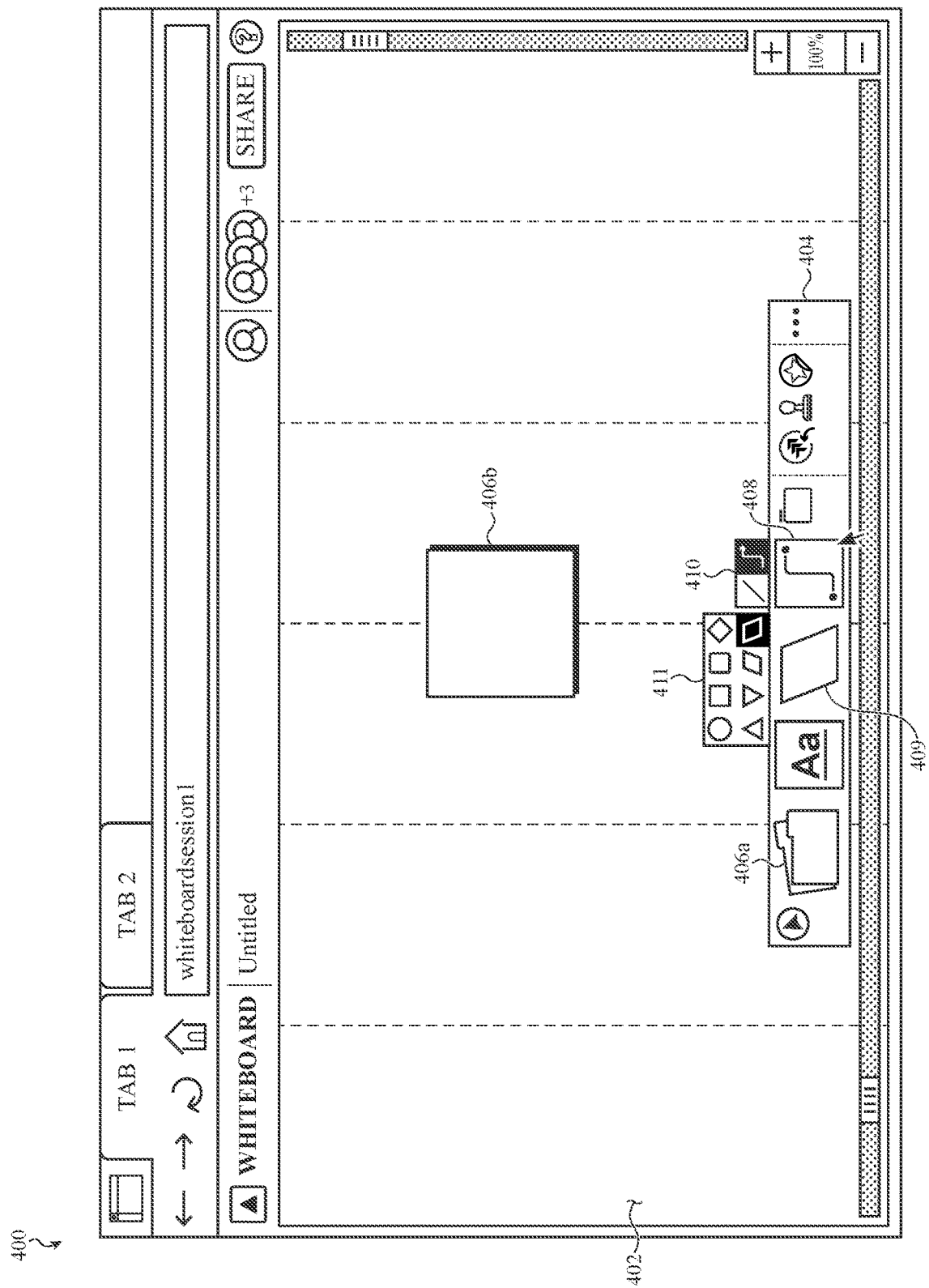
FIGS. 4A-4C depict an example graphical user interface used to generate compressed user menus.

FIG. 4A depicts details about the user interface of the quick access menu or primitive bar. In particular, the whiteboard interface 400 includes an unstructured canvas region 402 with a quick access menu or primitive bar 404. The quick access menu or primitive bar allows users to place primitives. Primitives may include sticky notes, text boxes, shapes, lines, and so on. A user may drag and drop the selected primitives from the quick access menu or primitive bar to the canvas to quickly create graphical objects. Similar to the compressed user menus explained above, the quick access menu or primitive bar 404 has a series of key indicators associated with each primitive. The key indicator changes in accordance with a user selection of a format of the primitive. For example, the key indicator associated with sticky notes 406a may change if a user updates the format of sticky note 406b. In this example, if a user changes the color of a sticky note from orange to green, the key indicator of the 406a of the sticky note updates from orange to green. As a result of this configuration, subsequent sticky notes placed by the user will be green. Thus, users placing multiple graphical objects have consistent formats without the need to change a default setting and/or having to copy and paste sticky notes to maintain the format.

In some embodiments, the quick access menu or primitive bar 404 may be a first level menu. Certain primitives within the quick access menu or primitive bar 404 may have an array of primitive types which are configured to be dragged and dropped onto the unstructured canvas region. Each of the primitive types shown has a primitive indicator which shows the user the primitive being selected and the configuration (e.g., shape, color, and so on) of the primitive. In some cases, a user selection of the primitive displays a sub-menu showing primitive subtypes where the user can select the graphical object shape and/or type to be placed. For example, a user selection of primitive 408 (e.g., a line) may display the sub-menu 410. The sub-menu 410 includes different shapes and/or configurations of a line, for example. In response to a user selection of a sub-menu 410 option, the primitive indicator of the primitive 408 is updated in accordance with the option from the sub-menu selected. Similar to the compressed menu described above, a quick access menu or primitive bar 404 has a main menu as a first level and a sub-menu as a secondary level. This configuration reduces the size of each menu, thus, increasing the visible area of the unstructured canvas region 402. As another example, in response to a user selection of the shapes primitive 409, a shape menu 411 may be displayed. Within the shape menu 411, a user may select a shape within a shape library. In response to a user selection of a shape in the shape menu, the primitive indicator in the shape primitive 409 is updated to reflect the user selection. In the example shown, in response to a user selection of a parallelogram, the primitive indicator of the shape primitive 409 becomes a parallelogram. In this configuration, a user may select the parallelogram primitive once and drag and drop into the unstructured canvas without having to re-select the parallelogram each time the shape primitive is invoked. In other words, when a user selects a primitive from the primitive bar, the primitive is rendered over the cursor of the user and the rendering follows the cursor of the user until the primitive is placed (e.g., the graphical object is generated). The rendering may have the same dimension (or substantially similar dimension) as the graphical object that is generated.

In this example configuration, the user may visualize the actual size and shape of the primitive when selecting and placing them onto the unstructured canvas. In some embodiments, some primitive types may not have sub-types. In response to a user selection of those primitive types, the system may suppress display of a sub-menu for the selected primitive element in the primitive bar.

Figure 4B:
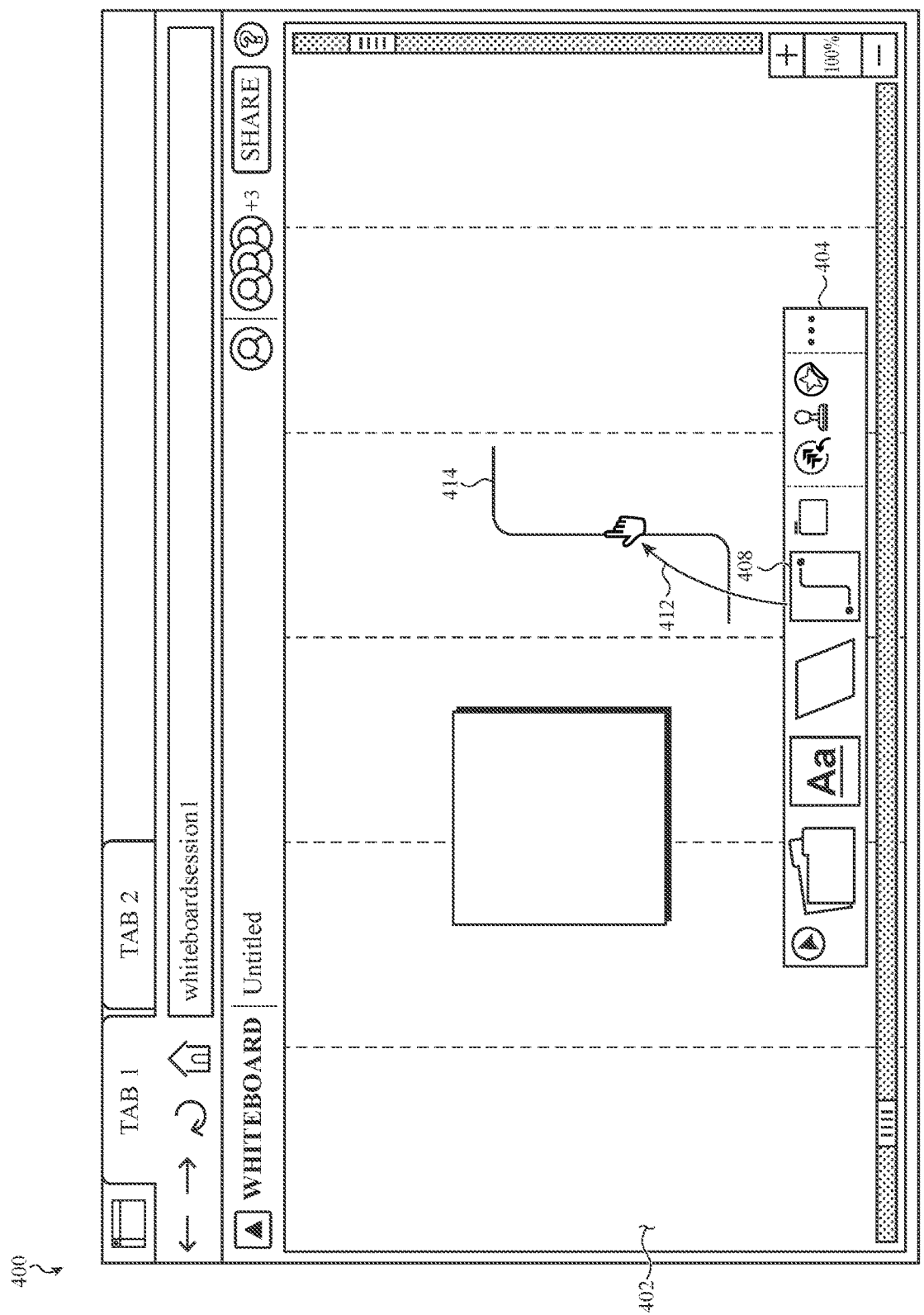

FIG. 4B depicts an example placing method of primitives from the quick access menu or primitive bar. In this example, a user drags a primitive, such as the key indicator of a line (e.g., primitive 408), into the unstructured canvas region 402. In response to detecting the user's swipe motion 412 across a portion of the canvas region 402, a service may cause display of the unplaced primitive having the same size as the graphical object to be placed onto the canvas region 402. In this configuration, a user may easily visualize the size of the object to be placed onto the canvas region. Similarly, this configuration is beneficial because primitives can be placed onto the canvas region 402 with consistent sizes.

Figure 4C:
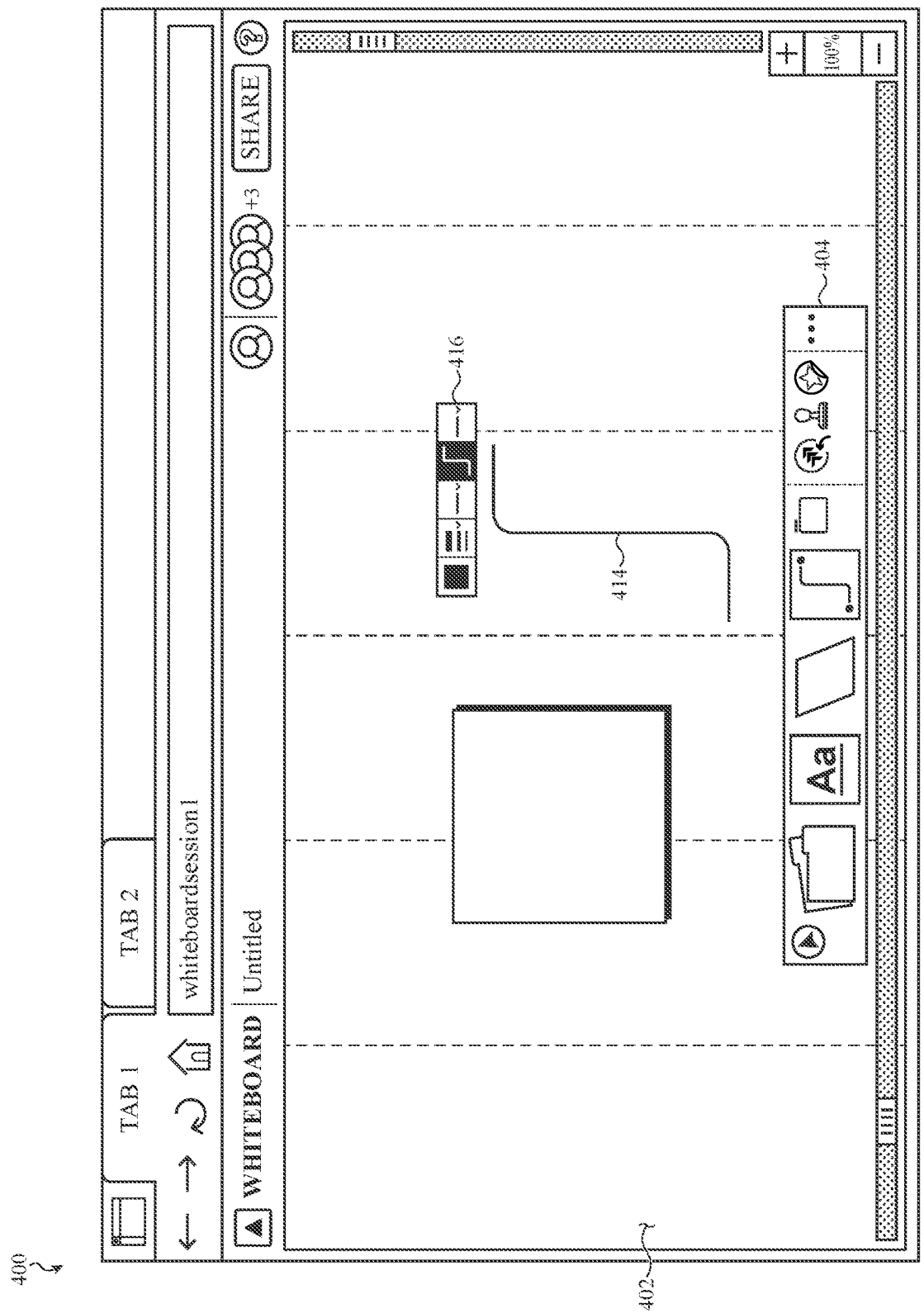

FIG. 4C shows an example compressed user menu for graphical objects without text. When a user selects a graphical object without text, such as graphical object 414 (e.g., a line), a compressed user menu 416 may be displayed. Similar to compressed user menu 304, compressed user menu 416 may have a fixed number of user controls having key indicators. In this example, the key indicators correspond to formatting options of the graphical object 414. In accordance with a user selection of the graphical object, a UI primitive type or content block type may be identified. In response to the primitive type being a primitive that receives text, such as a sticky note, a compressed user menu (such as compressed user menu 304) may be displayed with text formatting options. In response to a different primitive type, the compressed user menu 416 may suppress display of text formatting options. In other words, a backend application determines the UI primitive type of the selected graphical object and displays a different compressed user menu in accordance with the identified primitive(s). The compressed user menu 416 may also update its key indicator based on the selected primitive sub-type. In the example depicted in the figure, in response to the user in FIG. 4A selecting an elbow-type line (e.g., the primitive sub-type), the primitive indicator updates to show the elbow-type line. Similarly, the key indicator of the compressed user menu 416 updates to show that the elbow-type line has been selected. This method works vice versa. For example, in response to a change in the compressed user menu of a primitive sub-type, a primitive indicator corresponding to a primitive object in the primitive bar updates. Thus, subsequent user selections of a primitive object (e.g., by dragging and dropping) renders primitives which have the same format option (e.g., a primitive sub-type) as the last-selection format option applied. These format selections may be performed on a primitive object type-basis. For example, the user may choose different formats for sticky notes, lines, and shapes and those user preferences may be updated in each individual primitive indicator of each primitive object accordingly.

Figure 5:
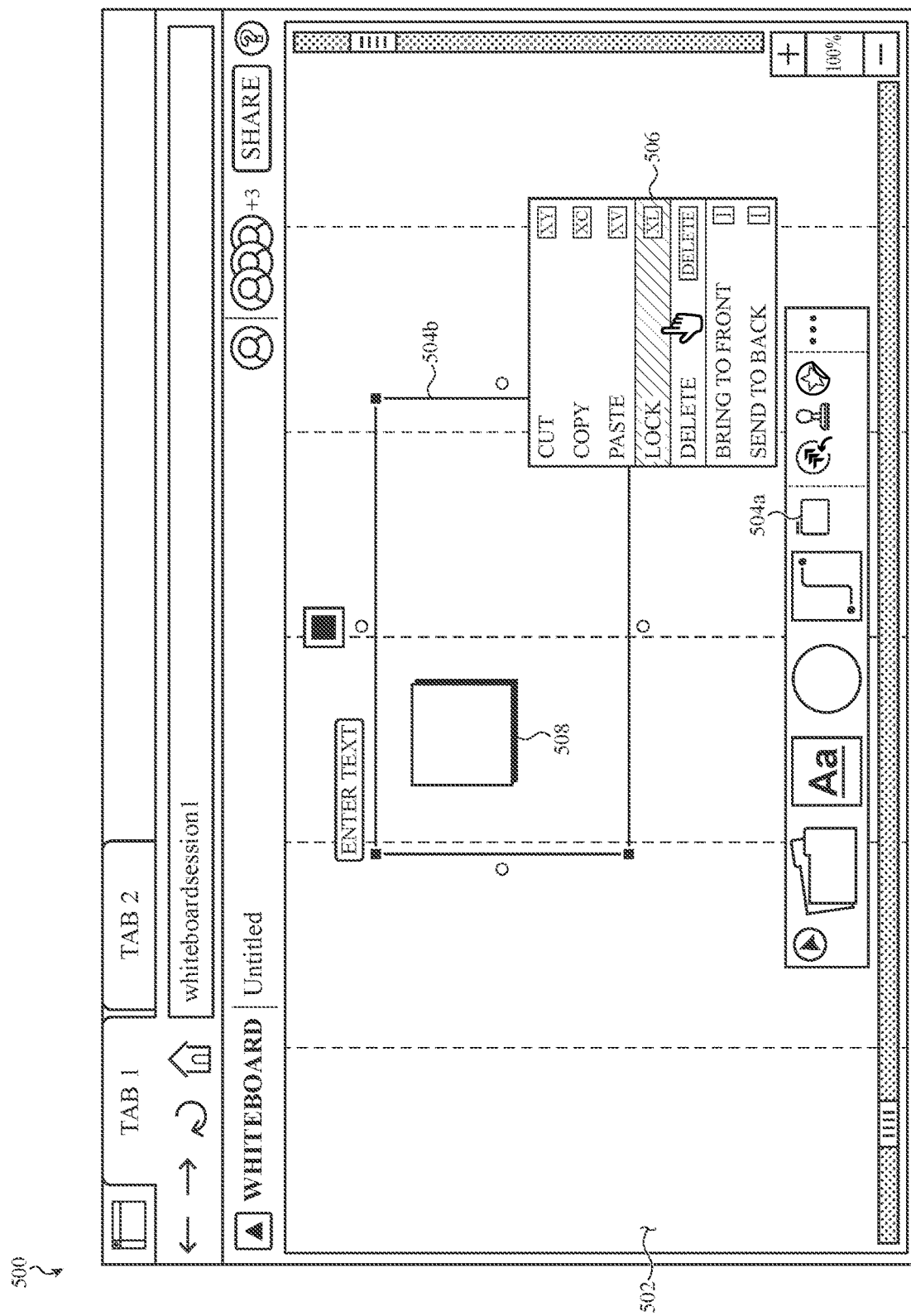
FIG. 5 depicts an example graphical user interface used to create sub-regions within the canvas.

FIG. 5 depicts an example additional user interface features which facilitate collaborating in the whiteboard. As explained above, the graphical user interface 500 of a whiteboard includes an unstructured canvas region 502 configured to receive user inputs, such as primitives, from multiple users collaborating in real time (e.g., during a videoconference). In some cases, due to the unstructured nature of the canvas, a user may elect to carve out a sub-region within the canvas where the user may have more control of the content placed within the carved-out region. This sub-region is a primitive which operates as a grouping object to other graphical objects and/or primitives. For example, the sub-region primitive 504b may place certain restrictions on other users such that content within the sub-region cannot be added, deleted, and/or edited by other users. The quick access menu or primitive bar may include a user region option 504a. In response to a selection of the user region option 504a, the user may draw a boundary to define the user sub-region primitive 504b. While the sub-region primitive 504b is shown as rectangular, any shape and/or hand drawn boundary is envisioned. Once a region is created, the user may add graphical objects (e.g., graphical object 508) within the sub-region primitive 504b, in the same way as adding graphical objects to the unstructured canvas region 502. A user may also specify which users may modify (e.g., add, delete, edit) the graphical objects within the sub-region primitive 504b and/or the user may specify restrictions in general. The boundaries of the sub-region primitive 504b may be expanded and/or reduced. In response to a user moving the sub-region 504b within the unstructured canvas region 502, the graphical objects within the sub-region primitive 504b (such as graphical object 508) moves with the region. Thus, the graphical objects within the sub-region maintain a fixed relation with respect to the region.

In some embodiments, a user can lock graphical objects and/or regions within the unstructured canvas. For example, a user menu may include a "LOCK" option 506 that displays in response to a user selection of at least one graphical object. Locking a graphical object and/or region prevents all users—including the user which locked the graphical object—from moving the locked objects. This feature is beneficial to prevent altering and/or accidental moving of graphical objects. To allow movement, a user may be displayed an "UNLOCK" option (not shown). In some examples, a locked region and/or graphical object may display a visual cue to users (such as a closed padlock) to convey to the user that the region and/or graphical object may not be moved.

Figure 6:
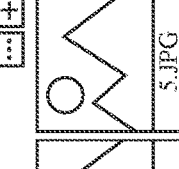
FIG. 6 depicts an example graphical user interface of an issue tracking platform.

Selectable graphical objects in the virtual whiteboard correspond to issue objects in the issue tracking system and may be selectable to display additional information about the issue in the graphical user interface of the virtual whiteboarding application or in a graphical user interface of the issue tracking system. FIG. 6 depicts an example graphical user interface 600 of an issue tracking system. Specifically, the graphical user interface 600 depicts issue object data associated with an issue managed and tracked by a corresponding issue tracking system or platform. The graphical user interface 600 may be displayed in response to a user selection of one of the issue objects described herein. The graphical user interface 600 may be provided by a frontend or client of an issue tracking platform executing or operating on a client device. The graphical user interface 600 may include various issue or object data that is associated with the respective issue. As described previously, some of this issue data may be used to generate the issue graphical elements in the virtual whiteboarding application. Changes to the issue data occurring due to input received at the graphical user interface 600 or otherwise implemented by the issue tracking system will automatically be updated when the issue graphical element is loaded or refreshed. The graphical user interface 600 depicts the issue on a single screen, however, the issue data may be displayed using a series of tabs or links available through the graphical user interface 600.

As shown in FIG. 6, the issue data includes text stored as fields or elements of the issue object. Issue fields include, for example, issue title, issue description, notes, and comments. Other issue data may include attachments or non-text content that is associated or stored with the issue object. Example non-text content includes screenshots, diagrams, and other graphical content that may be stored as image or other media files. Other example attachment content includes source code files, test results, user logs, and other similar content. The issue data may also include references or links to other system objects including, for example, projects or epics, which may have a parent-child relationship with the particular issue. Similarly, the issue data may include references or links to other issues identified as subtasks of the issue and may have a child-parent relationship with the particular issue. The issue data may also include references or pointers to other system elements like a system user or user profile identified as an assignee, owner, reviewer, or other role associated with the issue object.

While the foregoing discussion is directed to issue objects in the virtual whiteboard application corresponding to issues managed by the issue tracking system, the same principles apply to objects managed by any third-party system. For example, the same principles apply to content items managed by a content management system, mockup items managed by a user interface design system, or any other objects managed by any other third-party system. The virtual whiteboarding application may operate as described above to generate graphical elements corresponding to an object managed by a third-party system, accept user input for moving or modifying the graphical elements and, thus, the objects corresponding thereto, relate graphical elements and, thus, the objects corresponding thereto, and visualize relationships between objects.

Figure 7:
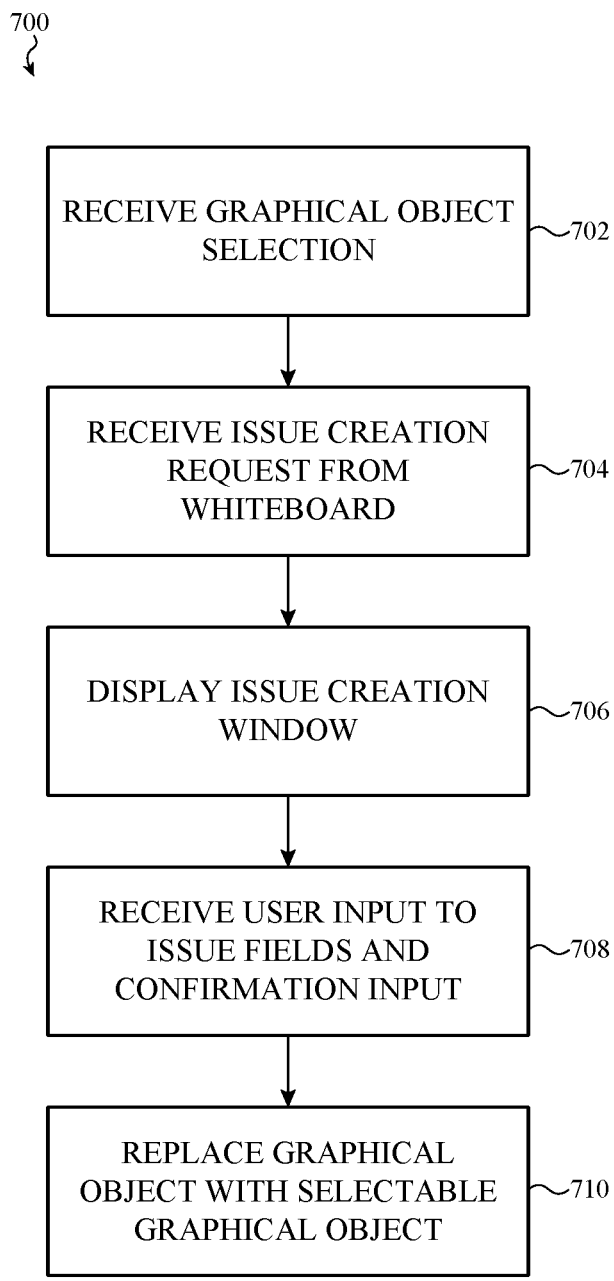
FIG. 7 depicts a flowchart of an example method for creating issue objects from graphical objects in the whiteboard.

FIG. 7 shows a simplified example method 700 for creating issue objects in the whiteboard. At step 702, a graphical object selection is received. As explained above with respect to FIGS. 2A-2F, an area with multiple graphical objects may be selected or a single graphical object may be selected, as a non-limiting example. At step 704, an issue creation request is received. The issue creation request may be received from a button or other menu option in a user menu of the whiteboard. At step 706, an issue creation window is displayed to the user. As discussed previously, the issue creation window may have user-editable areas (e.g., fillable, drop-down, and so on) that may accord with fields in an issue tracking platform. At step 708, user inputs to the issue fields and a confirmation input is received. At this step, the system may identify the user inputs with respect to a minimum required fields to create an issue. If the minimum fields are input, the confirmation input is accepted and an API call is created to create issues in the issue tracking platform. At step 710, the native graphical objects are replaced with a selectable graphical object corresponding to the created issue object in the issue tracking platform. The selectable graphical object displays metadata of the issue to authenticated users (e.g., users with the appropriate permissions user profile).

Figure 8:
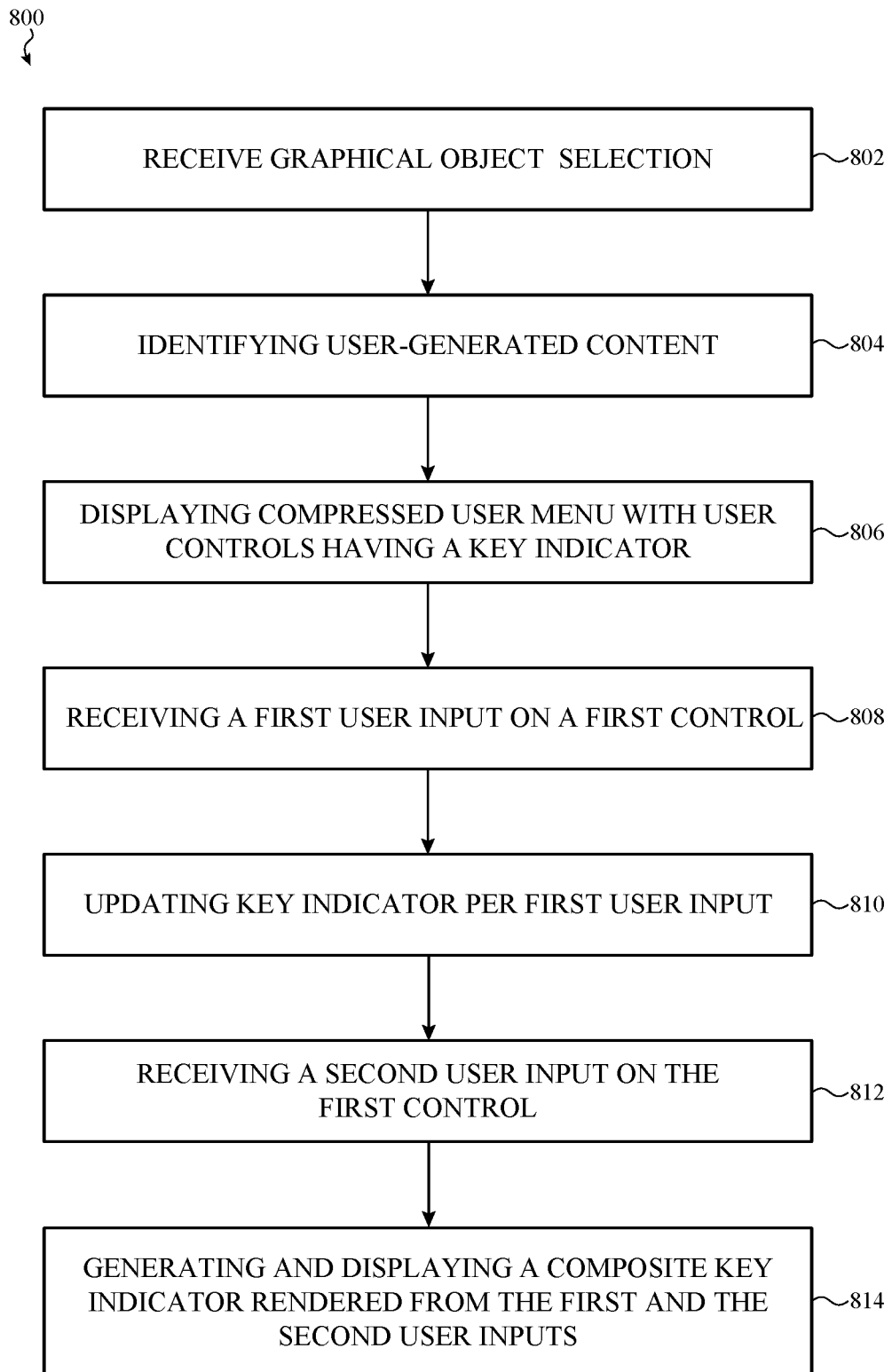
FIG. 8 depicts a flowchart of an example method for rendering compressed user menus.

FIG. 8 shows a simplified example method 800 for generating and displaying compressed user menus. At step 802, a graphical object selection is received. The selection may be a single graphical object or a plurality of graphical objects, in accordance with the above disclosure. At step 804, user-generated content of the graphical object may be identified. In addition to identifying user-generated content, the step may also identify a primitive type of the selected graphical object to determine the user controls to be displayed. At step 806, the compressed user menu is displayed. The user menu may have a series of user controls, each represented by a key indicator. Each user control may represent a format category or functionality (e.g., integration with third party content and/or other platforms). At step 808, a first user input of a first control is received. In accordance with the user input, the graphical object may be updated in accordance with the user input. Likewise, at step 810, the key indicator of the first user control is updated accordingly. At step 812, a second user input of the first user control is received. The graphical object is updated in accordance with the second user input. At step 814, a composite key indicator of the first user control is generated. The composite key indicator may be a combined key indicator that conveys to a user that two input options are enabled for the graphical object selected. The composite key indicator is displayed in the compressed user menu accordingly.

Figure 9:
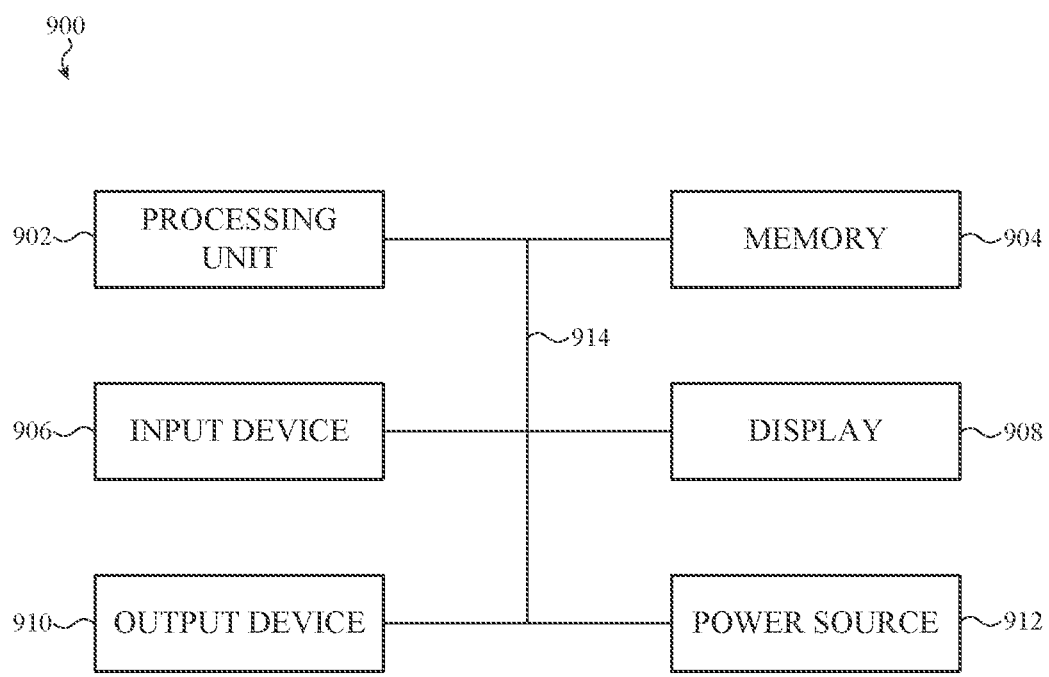
FIG. 9 depicts an example device in accordance with the embodiments described herein.

FIG. 9 depicts a sample electrical block diagram of an electronic device 900 that may perform the operations described herein. The electronic device 900 may in some cases take the form of any of the electronic devices described with reference to FIGS. 1-8, including client devices, and/or servers or other computing devices associated with the system 100. The electronic device 900 can include one or more of a display 908, a processing unit 902, a power source 912, a memory 904 or storage device, input devices 906, and output devices 910. In some cases, various implementations of the electronic device 900 may lack some or all of these components and/or include additional or alternative components.

The processing unit 902 can control some or all of the operations of the electronic device 900. The processing unit 902 can communicate, either directly or indirectly, with some or all of the components of the electronic device 900. For example, a system bus or other communication mechanism can provide communication between the processing unit 902, the power source 912, the memory 904, the input device(s) 906, and the output device(s) 910.

The processing unit 902 can be implemented as any electronic device capable of processing, receiving, or transmitting data or instructions. For example, the processing unit 902 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements. It should be noted that the components of the electronic device 900 can be controlled by multiple processing units. For example, select components of the electronic device 900 (e.g., an input device 906) may be controlled by a first processing unit and other components of the electronic device 900 (e.g., the display 908) may be controlled by a second processing unit, where the first and second processing units may or may not be in communication with each other.

The power source 912 can be implemented with any device capable of providing energy to the electronic device 900. For example, the power source 912 may be one or more batteries or rechargeable batteries. Additionally or alternatively, the power source 912 can be a power connector or power cord that connects the electronic device 900 to another power source, such as a wall outlet.

The memory 904 can store electronic data that can be used by the electronic device 900. For example, the memory 904 can store computer-readable instructions that, when executed by the processing unit 902 may cause the device 900 to perform one or more of the operations or functions described herein. The memory 904 can also be used to store other electronic data or content including, for example, audio and video files, documents and applications, device settings and user preferences, timing signals, control signals, and data structures or databases. The memory 904 can be configured as any type of memory. By way of example only, the memory 904 can be implemented as random access memory, read-only memory, flash memory, removable memory, other types of storage elements, or combinations of such devices.

In various embodiments, the display 908 provides a graphical output associated with an operating system, user interface, and/or applications of the electronic device 900 (e.g., documentation creation user interface, a chat user interface, an issue-tracking user interface, an issue-discovery user interface). In one embodiment, the display 908 includes one or more sensors and is configured as a touch-sensitive (e.g., single-touch, multi-touch) and/or force-sensitive display to receive inputs from a user. For example, the display 908 may be integrated with a touch sensor (e.g., a capacitive touch sensor) and/or a force sensor to provide a touch- and/or force-sensitive display. The display 908 is operably coupled to the processing unit 902 of the electronic device 900.

The display 908 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 908 is positioned beneath and viewable through a cover that forms at least a portion of an enclosure of the electronic device 900.

In various embodiments, the input devices 906 may include any suitable components for detecting inputs. Examples of input devices 906 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 906 may be configured to detect one or more particular types of input and provide a signal (e.g., an input signal) corresponding to the detected input. The signal may be provided, for example, to the processing unit 902. As discussed above, in some cases, the input device(s) 906 include a touch sensor (e.g., a capacitive touch sensor) integrated with the display 908 to provide a touch-sensitive display. Similarly, in some cases, the input device(s) 906 include a force sensor (e.g., a capacitive force sensor) integrated with the display 908 to provide a force-sensitive display.

The output devices 910 may include any suitable components for providing outputs. Examples of output devices 910 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 910 may be configured to receive one or more signals (e.g., an output signal provided by the processing unit 902) and provide an output corresponding to the signal.

In some cases, input devices 906 and output devices 910 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B. or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method for displaying a compressed user menu within a graphical user interface of a virtual whiteboard, the method comprising:
    causing display of the graphical user interface of the virtual whiteboard comprising an unstructured canvas region configured to render graphical objects generated by multiple users from multiple user devices;
    rendering a plurality of graphical objects from multiple users having a user-defined area and positioned within the unstructured canvas region;
    in response to a user selection of at least one graphical object of the plurality of graphical objects:
        identifying an object primitive type of the at least one graphical object;

in response to identifying the object primitive type of the at least one graphical object, selecting a set of user-selectable controls associated with the object primitive type;
causing display of a menu control comprising a first horizontal array of the set of user-selectable controls, a first user-selectable control of the set of user-selectable controls displaying a first key indicator corresponding to a first format option, the first key indicator displayed inside a boundary of the first user-selectable control defining a predetermined area; and
in response to receiving a first selection of the first user-selectable control, applying the first format option to the at least one graphical object;
in response to receiving a second user selection of an element of the menu control, causing display of an auxiliary menu control comprising a second horizontal array of user selectable controls including a first auxiliary selectable control corresponding to the first format option and a second auxiliary selectable control corresponding to a second format option;
in response to receiving a third user selection of the second auxiliary selectable control, causing the second format option to be applied to the at least one graphical object; and
replacing the first key indicator of the first user-selectable control with a composite key indicator that corresponds to a composite format option that includes the first format option and the second format option, the composite format option comprising an image indicating that both the first format option and the second format option are to be applied to a respective user selection, the composite key indicator displayed inside the boundary of the first user-selectable control defining the predetermined area.

2. The method of claim 1, comprising:
in response to a third selection of the first user-selectable control including the composite key indicator, causing the first format option and the second format option to be applied to the at least one graphical object.

3. The method of claim 1, wherein:
in accordance with a respective format option being applied to the at least one graphical object, removing the respective format option with respect to the at least one graphical object in response to a selection of the first user-selectable control; and
in accordance with the respective format option not being applied to the at least one graphical object, applying the respective format option in response to the selection of the first user-selectable control.

4. The method of claim 1, comprising:
in response to receiving an input corresponding to a selection of one of the first auxiliary selectable control and the second auxiliary selectable control of the auxiliary menu control, ceasing to display the auxiliary menu control.

5. The method of claim 1, wherein subsequent selection of the at least one graphical object causes display, within the menu control, of a second key indicator, the second key indicator corresponding to a last format option selected with respect to the at least one graphical object.

6. The method of claim 1, comprising:
in response to a user deselecting the first format option, updating the composite key indicator to a second key indicator corresponding only to the second format option.

7. The method of claim 6, comprising:
in response to the user deselecting the second format option, updating the second key indicator to a third key indicator corresponding to a default format option.

8. A method for updating a user menu in a virtual whiteboard, the method comprising:
causing display of a graphical user interface of the virtual whiteboard comprising an unstructured canvas region configured to render graphical objects generated by multiple users from multiple user devices;
causing display of a primitive bar menu, the primitive bar menu comprising an array of primitive types configured to be dragged onto the unstructured canvas region, each primitive type having a corresponding default primitive indicator;
in response to a user selection of a first primitive type of the array of primitive types, causing display of a sub-menu comprising a set of primitive sub-types;
in accordance with a user selection of a first primitive sub-type of the set of primitive sub-types, updating the default primitive indicator corresponding to the first primitive type to a first key indicator indicating the selected first primitive sub-type, the first key indicator displayed inside a boundary of a first user-selectable control defining a predetermined area;
rendering, over a cursor of the user, a preview graphical object corresponding to the first primitive sub-type;
in response to receiving a user selection corresponding to a position of the first primitive sub-type over the unstructured canvas region, generating a graphical object at the unstructured canvas region corresponding to the first primitive sub-type; and
in accordance with a user selection of a second primitive sub-type of the set of primitive sub-types, updating the first key indicator to indicate the selected second primitive sub-type within the predetermined area.

9. The method of claim 8, comprising:
in response to receiving a dragging motion from the first primitive type within the primitive bar menu to the unstructured canvas region, rendering the first primitive type over the cursor of the user, the rendering having a same dimension as a dimension of the generated graphical object.

10. The method of claim 8, comprising:
in response to a user selection of a second primitive type of the array of primitive types:
identifying primitive sub-types; and
in accordance with the second primitive type having a single primitive sub-type, suppressing display of the sub-menu.

11. The method of claim 8, comprising:
causing display of a user-control menu comprising a set of user controls, each user control having a corresponding key indicator; and
updating display of a key indicator of a first user control of the set of user controls corresponding to the first primitive type.

12. The method of claim 8, wherein the first primitive type is a shape and the set of primitive sub-types are types of shapes.

13. The method of claim 8, wherein the first primitive type is a line and the set of primitive sub-types are line shapes.

14. The method of claim 8, wherein the primitive bar menu further comprises a create issue option configured to generate an application programming interface (API) call to an issue tracking platform.

15. A method for displaying and updating user menus within a graphical user interface of a virtual whiteboard, the method comprising:

causing display of the graphical user interface of the virtual whiteboard comprising:

an unstructured canvas region configured to render first graphical objects generated by multiple users from multiple user devices; and a primitive bar comprising a set of selectable primitive objects, each selectable primitive object displaying a corresponding primitive indicator, the primitive bar configured to create second graphical objects in response to user input;

rendering a plurality of third graphical objects from multiple users having a user-defined area and positioned within the unstructured canvas region;

in response to a user selection of a first graphical object of the plurality of third graphical objects:

identifying an object primitive type of the first graphical object;

in response to identifying the object primitive type of the first graphical object, selecting a set of user-selectable controls associated with the object primitive type;

causing display of a menu control comprising an array of the set of user-selectable controls, each user-selectable control displaying a corresponding key indicator;

in response to receiving a selection of a first user-selectable control of the set of user-selectable controls corresponding to a first format option, updating a key indicator of the first user-selectable control to correspond to the first format option, the key indicator comprising a first image indicating that the first format option is to be applied to a respective user selection, the key indicator displayed inside a boundary of the first user-selectable control defining a predetermined area;

updating display, within the primitive bar, of the primitive indicator corresponding to the object primitive type, to a first selectable primitive object of the set of selectable primitive objects, and to the first format option, the first selectable primitive object comprising a second image indicating a selected primitive type;

in accordance with receiving a first user selection of the first selectable primitive object, rendering a second graphical object having the first format option applied; and in response to receiving a second user selection of a second user-selectable control of the set of user-selectable controls corresponding to a second format option, replacing the key indicator with a composite key indicator that corresponds to a composite format of the first format option and the second format option, the composite key indicator displayed inside the boundary of the first user-selectable control having the predetermined area.

16. The method of claim 15, comprising:

in accordance with a user selection of a third graphical object:

identifying the object primitive type;

identifying a set of format options corresponding to the third graphical object; and updating display, within the primitive bar, of the primitive indicator corresponding to a second selectable primitive object.

17. The method of claim 15 wherein the set of selectable primitive objects comprise a line, a shape, a sticky note, and a text box.

18. The method of claim 15 wherein at least one of the first format option and the second format option is a color.

19. The method of claim 15 wherein at least one of the first format option and the second format option is a line shape.

20. The method of claim 15 wherein at least one of the first format option and the second format option is a shape type.

* * * * *